(12) United States Patent
Kimener et al.

(10) Patent No.: US 11,592,140 B2
(45) Date of Patent: Feb. 28, 2023

(54) TRAILER STABILIZERS

(71) Applicant: Stabilock, LLC, Loveland, OH (US)

(72) Inventors: Thomas T. Kimener, Loveland, OH (US); Robert P. Kimener, Loveland, OH (US)

(73) Assignee: Stabilock, LLC, Loveland, OH (US)

( * ) Notice: Subject to any disclaimer, the term of this patent is extended or adjusted under 35 U.S.C. 154(b) by 87 days.

(21) Appl. No.: 16/891,223

(22) Filed: Jun. 3, 2020

(65) Prior Publication Data

US 2021/0048141 A1 Feb. 18, 2021

Related U.S. Application Data

(60) Provisional application No. 62/856,780, filed on Jun. 4, 2019.

(51) Int. Cl.
| | |
|---|---|
| *F16M 11/24* | (2006.01) |
| *F16M 11/42* | (2006.01) |
| *B65G 69/00* | (2006.01) |
| *B60S 9/04* | (2006.01) |
| *B60S 9/22* | (2006.01) |
| *B62D 37/00* | (2006.01) |

(52) U.S. Cl.
CPC ........... *F16M 11/24* (2013.01); *B65G 69/003* (2013.01); *F16M 11/42* (2013.01); *B60S 9/04* (2013.01); *B60S 9/22* (2013.01); *B62D 37/00* (2013.01)

(58) Field of Classification Search
CPC ...... F16M 11/24; F16M 11/42; B65G 69/003; B62D 37/00; B62D 53/0857
See application file for complete search history.

(56) References Cited

U.S. PATENT DOCUMENTS

| | | | | |
|---|---|---|---|---|
| 3,521,902 | A | * | 7/1970 | Akers .................... B62D 37/00 414/498 |
| 4,087,785 | A | * | 5/1978 | Dodich ................ B62D 63/064 362/153.1 |
| 4,840,532 | A | * | 6/1989 | Galbreath ............. B60P 1/6454 414/500 |
| 5,575,492 | A | * | 11/1996 | Stone ........................ B60S 9/04 280/475 |
| 6,062,545 | A | * | 5/2000 | Peavler .................... B60D 1/66 254/DIG. 4 |
| 6,520,472 | B1 | | 2/2003 | Manich et al. |
| 7,188,842 | B2 | * | 3/2007 | Thorpe ..................... B60S 9/06 296/156 |
| 8,497,761 | B2 | | 7/2013 | McNeill et al. |
| 10,065,689 | B2 | | 9/2018 | Wiegel et al. |
| 10,113,352 | B2 | | 10/2018 | McNeill et al. |
| 2019/0256059 | A1 | * | 8/2019 | Ruppert .................... B60S 9/04 |
| 2019/0308855 | A1 | * | 10/2019 | Wiegel .................... B60S 13/00 |
| 2020/0324741 | A1 | * | 10/2020 | Gledhill .................... B60S 9/04 |

* cited by examiner

*Primary Examiner* — Tan Le

(74) *Attorney, Agent, or Firm* — Dorton & Willis, LLP; Ryan Willis

(57) ABSTRACT

Supports utilized to stabilize and/or support parked trailers, such as semitrailers parked at loading docks while loading and/or unloading cargo, are disclosed. Some example embodiments may include jacks mounted to repositionable frames, which may be mounted to posts. Some example embodiments may be configured to engage with king pin plates and/or king pins on the undersides of trailers.

25 Claims, 19 Drawing Sheets

TRAILER STABILIZERS

CROSS REFERENCE TO RELATED APPLICATIONS

This application claims the benefit of U.S. Provisional Application No. 62/856,780, filed Jun. 4, 2019, which is incorporated by reference.

INTRODUCTION TO THE INVENTION

The present disclosure is directed to supports, restraints, and controls utilized with parked trailers and, more particularly, to stabilizing systems, restraint systems, associated controls, and monitoring devices that may be used, for example, with semitrailers parked at loading docks while loading and/or unloading cargo.

The present disclosure contemplates that distribution warehouses are a necessary component of commerce in the twenty-first century. These warehouses may act as clearinghouses for shipments from various product suppliers and centralize the distribution of goods. Large chain retailers utilize warehouses to generate shipments to particular points of sale that are specific to the needs of consumers in that area, without requiring the original manufacturer of the goods to identify consumer demand at each point of sale and correspondingly deliver the particular goods to each point of sale.

The present disclosure contemplates that an example distribution warehouse generally includes fifteen or more loading docks, with each loading dock adapted to receive a single freight trailer of a semi-truck. A loading dock typically includes an opening elevated above ground level to match the height of the floor of the freight trailer. The relatively equal height between the floor of the loading dock and the floor of the trailer enables lift trucks (e.g., forklifts) and other material handling devices to move freely back and forth between the warehouse and interior of the freight trailer.

The present disclosure contemplates that in an example sequence, a loading dock opening of a warehouse is initially unoccupied by a freight trailer. Thereafter, a semitrailer driver or yard truck driver backs the rear opening of a freight trailer into alignment with the opening of the dock. After the rear of the freight trailer is properly aligned and positioned adjacent to the dock opening, the driver will either continue the engagement between the truck and trailer, or discontinue the engagement and relocate the truck to a remote location. In the context of yard trucks, the yard truck is only connected to the freight trailer long enough to position it adjacent to the loading dock opening. In an example day, the yard truck may connect to and disconnect from one hundred or more freight trailers.

The present disclosure contemplates that, in summary fashion, a yard truck is a dedicated tractor that stays at the warehouse location and is only used to reposition freight trailers (not to tow the trailers on the open highways). By way of example, a warehouse may have ten dock openings, but have fifty trailers waiting to be unloaded and/or unloaded. In order to expedite freight unloading and loading, as well as the convenience of the semi-truck drivers that deliver to or pick up the freight trailers from the warehouse, the freight trailers need to be shuffled. This means that freight trailers do not include dedicated semi tractors continuously connected to them. Instead, because no semi-tractor is connected to many, if not all, of the freight trailers at a warehouse location, a yard truck is necessary to reposition the freight trailers at the warehouse location.

The present disclosure contemplates that an exemplary process for operating the yard truck and the freight trailer includes initially raising a hydraulic fifth wheel on the yard truck to raise the front end of the trailer (e.g., above its normal ride height). While the front end is raised, the landing gear of the freight trailer, which comprises a pair of equal length jacks permanently mounted to the trailer, are lifted off of the ground so as to allow movement of the trailer. When the trailer is in the desired position, the fifth wheel on the yard truck is lowered to set down the freight trailer on its landing gear. (If necessary, the yard truck driver may lower the landing gear.) When the freight trailer is set down on its landing gear, the freight trailer is freestanding (e.g., without a mechanical connection between the king pin of the freight trailer and the fifth wheel of the yard truck). After the freight trailer is freestanding, associated pneumatic and electrical connections between the yard truck and trailer are disconnected so that the brakes of the freight trailer are locked. Thereafter, the yard truck pulls out from under the freight trailer, thereby leaving the trailer adjacent to the dock opening and being supported at the front end using only the trailer's landing gear. (It will be appreciated that a standard over-the-road tractor could be used in place of a yard truck, if desired.)

The present disclosure contemplates that when loading and unloading cargo from a freestanding freight trailer, the movement of the lift truck along the floor of the freight trailer causes the freight trailer to move as well. While some movement of the freight trailer is inevitable, considerable movement can result in the trailer becoming separated from the dock or possibly tipping over. More importantly, the landing gear of the freight trailer is not designed to accommodate the weight of a fully loaded trailer, let alone the dynamic forces generated by a lift truck moving through a partially loaded freight trailer. Even further, the high center of gravity associated with most trailers makes the likelihood of tipping over a real possibility. The obvious implications of a freight trailer tipping over include damage to the goods within the trailer, the trailer itself, and the lift truck, not to mention the possible serious injury to or death of the lift truck operator.

The present disclosure contemplates that there is a need in the industry for a reliable support that maintains the relative position of the freight trailer with respect to the dock and reduces the likelihood of the trailer tipping over, possibly causing serious bodily injury or death, and which does not rely solely on the landing gear of the freight trailer.

It is a first aspect of the present disclosure to provide a support for stabilizing a parked trailer including a post configured to extend upward from a surface laterally adjacent to a parking location for a trailer and/or a frame repositionably coupled to the post. The frame may include a first coupling vertically repositionable with respect to the post and/or a first jack coupled to the frame. The frame may be repositionable between a stowed position laterally adjacent to the parking location and a deployed position in which the frame is configured to be at least partially beneath the trailer parked in the parking location. When in the deployed position, the first jack may be configured to wedge at least one of the first jack and the frame between an underside of the trailer and the surface when the trailer is parked in the parking location.

In a more detailed embodiment of the first aspect, the support may include a second jack coupled to the frame. In the deployed position, the second jack may be configured to wedge at least one of the second jack and the frame between the underside of the trailer and the surface when the trailer is parked in the parking location. The first jack and the second jack may be spaced apart along the frame with respect to the post.

In a more detailed embodiment of the first aspect, the support may include a support member disposed on the frame. When the first jack is retracted, the support member may be configured to contact the surface to support the frame above the surface. The support member may include a wheel and/or a caster.

In a more detailed embodiment of the first aspect, the frame may include an upper rail extending generally horizontally from the first coupling, a lower rail extending generally horizontally beneath the upper rail, and/or a vertical frame member extending generally vertically between the upper rail and the lower rail. The first jack may be operatively coupled to the upper rail to press upward on the upper rail when the first jack is extended. The support may include a second coupling, the second coupling being vertically slidably disposed on the post below the first coupling, the lower rail extending generally horizontally from the second coupling.

In a more detailed embodiment of the first aspect, the support may include an upwardly facing fifth wheel plate disposed on the frame. The underside of the trailer may include a downwardly facing king pin plate. The fifth wheel plate of the frame may be arranged to releasably engage the king pin plate of the trailer. The fifth wheel plate of the frame may include a slot, the king pin plate of the trailer may include a downwardly extending king pin, and/or the slot may be arranged to releasably engage the king pin. The frame may include at least one telescoping section arranged to provide vertical extension and/or horizontal extension of the frame. The fifth wheel plate of the frame may be rotatable with respect to the frame. The fifth wheel plate of the frame may be rotatable about 180 degrees with respect to the frame.

In a more detailed embodiment of the first aspect, the first post may be configured to be rigidly mounted with respect to the surface.

In a more detailed embodiment of the first aspect, the first post may be configured to be movably disposed with respect to the surface. The first post may be secured to a carriage and/or the carriage may be generally longitudinally movable with respect to the parking location. The carriage may include at least one wheel rollably disposed on a track secured to the surface. The carriage may include at least one wheel rollably disposed on the surface and/or the carriage may include a sensor configured to detect a guide line disposed in and/or on the surface.

In a more detailed embodiment of the first aspect, the frame may be rotatable about 90 degrees. In a more detailed embodiment of the first aspect, the frame may be rotatable about 180 degrees. In a more detailed embodiment of the first aspect, the frame may be rotatable about 360 degrees. In a more detailed embodiment of the first aspect, the frame may include a repositionable connector arranged to selectively engage an anchor secured to the surface.

In a more detailed embodiment of the first aspect, the post may be generally vertical. The frame may extend generally horizontally from the post. The first jack may be disposed on the frame and/or may be arranged to press downward on the surface and/or upward on the frame when the first jack is extended. The frame may be rotatable between the stowed position and the deployed position. In the deployed position, the first jack may be configured to lift the frame into an engaged position in which the frame is in contact with an underside of the trailer parked in the parking location.

It is a second aspect of the present disclosure to provide a stabilizer system for stabilizing a parked trailer including a first post configured to extend upward from a surface laterally adjacent to a parking location for a trailer; a first frame repositionably coupled to the first post, the first frame including a first coupling vertically repositionable with respect to the first post, and a first jack coupled to the first frame; a second post configured to extend upward from the surface laterally adjacent to the parking location, the second post being positioned generally laterally opposite of the first post with respect to the parking location; and/or a second frame repositionably coupled to the second post, the second frame including a second coupling vertically repositionable with respect to the second post, and a second jack coupled to the second frame. The first frame may be repositionable between a stowed position laterally adjacent to the parking location and a deployed position in which the first frame is at least partially beneath the trailer parked in the parking location. The second frame may be repositionable between the stowed position laterally adjacent to the parking location and the deployed position in which the second frame is at least partially beneath the trailer parked in the parking location. When in the deployed position, the first jack may be configured to wedge at least one of the first jack and the first frame between an underside of the trailer and the surface when the trailer is parked in the parking location. When in the deployed position, the second jack may be configured to wedge at least one of the second jack and the second frame between the underside of the trailer and the surface when the trailer is parked in the parking location.

In a more detailed embodiment of the second aspect, the stabilizer system may include a first support member disposed on the first frame and a second support member disposed on the second frame. When the first jack is retracted, the first support member may contact the surface to support the first frame above the surface and/or when the second jack is retraced, the second support member may contact the surface to support the second frame above the surface. The first support member and/or the second support member may include a wheel and/or a caster.

In a more detailed embodiment of the second aspect, the first frame may rotate clockwise from the stowed position to the deployed position and/or the second frame may rotate counter-clockwise from the stowed position to the deployed position.

In a more detailed embodiment of the second aspect, the first frame may include an upper rail extending generally horizontally from the first coupling, a lower rail extending generally horizontally beneath the upper rail, and/or a vertical frame member extending generally vertically between the upper rail and the lower rail. The first jack may be operatively coupled to the upper rail to press upward on the upper rail when the first jack is extended.

In a more detailed embodiment of the second aspect, the first frame may be rotatable at least one of hydraulically, pneumatically, and electrically and/or the second frame may be rotatable at least one of hydraulically, pneumatically, and electrically.

In a more detailed embodiment of the second aspect, the first jack may be extendable and/or retractable at least one of hydraulically, pneumatically, and electrically and/or the second jack may be extendable and/or retractable at least one of hydraulically, pneumatically, and electrically.

In a more detailed embodiment of the second aspect, the first post and the second post may be generally vertical. The first frame may extend generally horizontally from the first post and/or the second frame may extend generally horizontally from the second post. The first jack may be disposed on the first frame and/or may be arranged to press downward on the surface and/or upward on the first frame when the first jack is extended. The second jack may be disposed on the second frame and/or may be arranged to press downward on the surface and/or upward on the second frame when the second jack is extended. The first frame and/or the second frame may be rotatable between the stowed position and the deployed position. In the deployed position, the first jack may be configured to lift the first frame into an engaged position in which the first frame is in contact with an underside of the trailer parked in the parking location. In the deployed position, the second jack may be configured to lift the second frame into the engaged position in which the second frame is in contact with the underside of the trailer parked in the parking location.

It is a third aspect of the present disclosure to provide a method of operating a support for stabilizing a parked trailer, including repositioning a frame repositionably coupled to a post from a stowed position generally laterally adjacent to and generally parallel with a parked trailer to a deployed position at least partially beneath the trailer, and/or engaging the parked trailer with at least one of the frame and a jack coupled to the frame by extending the jack to form a wedge between an underside of the trailer and a surface on which the trailer is parked.

In a more detailed embodiment of the third aspect, the method may include, before the repositioning step, parking the trailer adjacent the frame. In a more detailed embodiment of the second aspect, the method may include, after the operation of engaging the parked trailer, disengaging the frame from the parked trailer by retracting the jack and/or repositioning the frame from the deployed position to the stowed position. The method may include, after the operation of repositioning the frame from the deployed position to the stowed position, towing the trailer away from adjacent the frame.

In a more detailed embodiment of the third aspect, the operation of engaging the parked trailer further may include engaging an upwardly facing fifth wheel plate on the frame with a downwardly facing king pin plate of the trailer. The operation of engaging the parked trailer may include engaging a slot in the fifth wheel plate on the frame with a downwardly extending king pin of the trailer. The operation of repositioning the frame may include extending and/or retracting at least one telescopic section of the frame to align the slot with the king pin at least one of horizontally and vertically.

In a more detailed embodiment of the third aspect, the method may include, prior to the operation of repositioning the frame, moving the post longitudinally with respect to the parked trailer.

In a more detailed embodiment of the third aspect, the method may include engaging the parked trailer with a trailer restraint mounted to a building adjacent the parked trailer. The method may include visually displaying an image on a display confirming engagement of the parked trailer by the support. Repositioning the frame may include pivoting the frame. Engaging the parked trailer may include extending the jack to lift the frame to contact the underside of the trailer.

It is a fourth aspect of the present disclosure to provide a method of preventing movement of a parked trailer, including repositioning a support, located between adjacent trailer parking locations on a ground, from outside a footprint of a parked trailer to at least partially inside the footprint; stabilizing a trailer near a forward end portion of the trailer by vertically repositioning the support to wedge the support between the ground and the parked trailer, and/or restraining the parked trailer near a rear end portion of the trailer by repositioning a restraint mounted to a building adjacent the parked trailer.

In a more detailed embodiment of the fourth aspect, stabilizing the trailer may include repositioning a first frame of a first repositionable trailer stabilizer from laterally adjacent and generally parallel with a first side of the trailer to at least partially beneath the forward end portion of the trailer. Stabilizing the trailer may include engaging the first frame with an underside of the trailer by extending a first jack disposed on the first frame. The method may include parking the trailer on a surface and/or extending the first jack may include extending a foot generally downward to the surface and raising the first frame generally upward to the underside of the trailer.

In a more detailed embodiment of the fourth aspect, stabilizing the trailer may include repositioning a second frame of a second repositionable trailer stabilizer from laterally adjacent and generally parallel a second side of the trailer to at least partially beneath the forward end portion of the trailer, the second side being opposite from the first side. Stabilizing the trailer may include engaging the first frame with an underside of the trailer by extending a first jack disposed on the first frame and/or engaging the second frame with the underside of the trailer by extending a second jack disposed on the second frame.

In a more detailed embodiment of the fourth aspect, restraining the trailer may include engaging a trailer restraint with the trailer. Engaging the trailer restraint with the trailer may include engaging a repositionable hook with a rear impact guard of the trailer.

It is a fifth aspect of the present disclosure to provide a method of verifying stabilization of a parked trailer, including repositioning a support, located between adjacent trailer parking locations, from outside a footprint of a parked trailer to at least partially inside the footprint, stabilizing the parked trailer near a forward end portion of the parked trailer by vertically repositioning the support to wedge the support between the ground and the parked trailer, and/or visually displaying an image on a display inside a building adjacent to the parked trailer depicting a position of the support with respect to the forward end portion of the parked trailer.

In a more detailed embodiment of the fifth aspect, the method may include restraining the parked trailer near a rear end portion of the trailer by repositioning a restraint mounted to the building and/or visually displaying a restraint image on a restraint display inside the building depicting a position of the restraint with respect to the rear end portion of the parked trailer.

BRIEF DESCRIPTION OF THE DRAWINGS

Example embodiments are described in conjunction with the accompanying drawing figures in which.

DETAILED DESCRIPTION

Example embodiments according to the present disclosure are described and illustrated below to encompass devices, methods, and techniques relating to stabilization and/or restraint and associated verification for semitrailers parked at loading docks while loading and/or unloading cargo. Of course, it will be apparent to those of ordinary skill in the art that the embodiments discussed below are examples and may be reconfigured without departing from the scope and spirit of the present disclosure. It is also to be understood that variations of the example embodiments contemplated by one of ordinary skill in the art shall concurrently comprise part of the instant disclosure. However, for clarity and precision, the example embodiments as discussed below may include optional steps, methods, and features that one of ordinary skill should recognize as not being a requisite to fall within the scope of the present disclosure.

The present disclosure includes, among other things, supports utilized to stabilize and/or support parked trailers, such as stabilizing jacks that may be used, for example, with semitrailers parked at loading docks while loading and/or unloading cargo. Various example embodiments are described and, unless specifically excluded, any example feature or method described in connection with any embodiment may be utilized in connection with any other example embodiment according to at least some aspects of the present disclosure.

Figure 1:
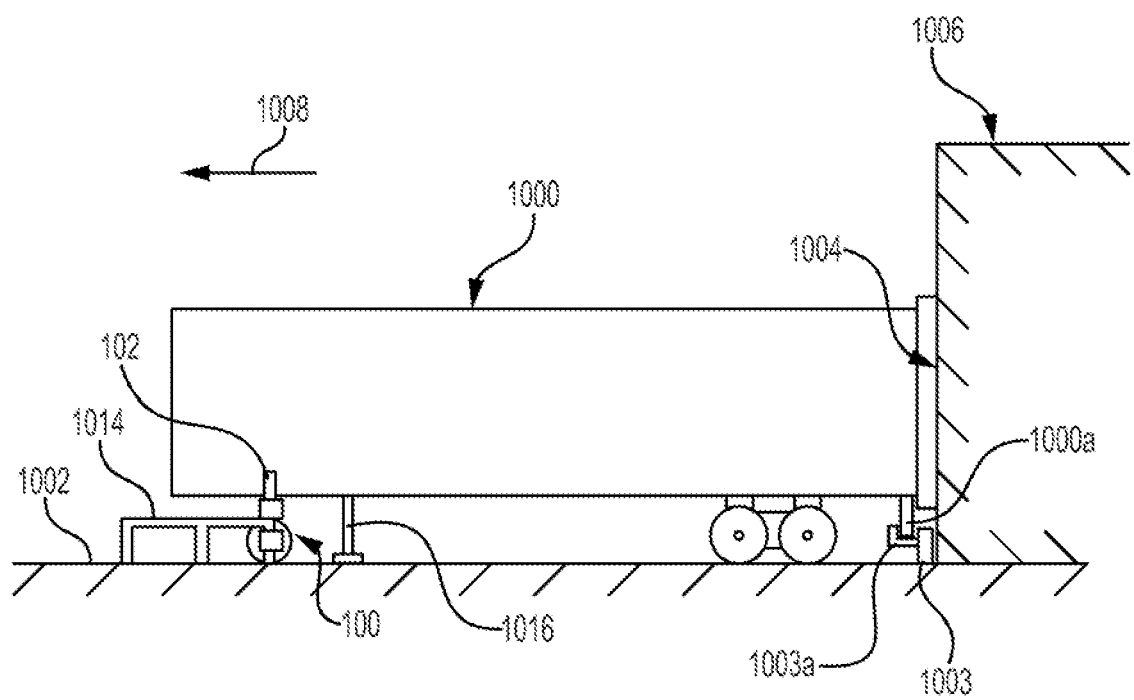
FIG. 1 is a side elevation view of an example stabilizer in an engaged position on a trailer, such as a semitrailer.
Figure 2:
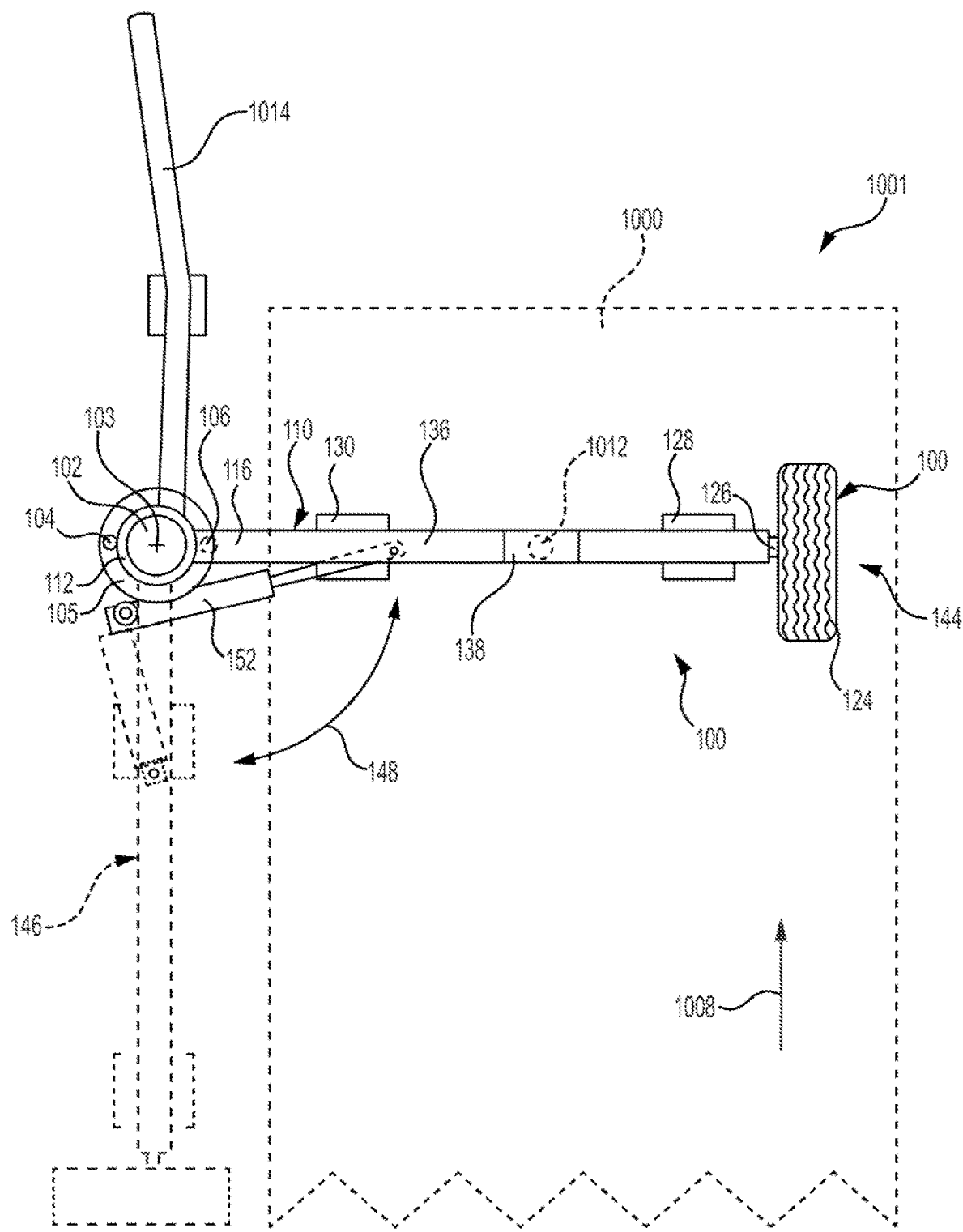
FIG. 2 is a plan view of an example stabilizer in an engaged position.
Figure 3:
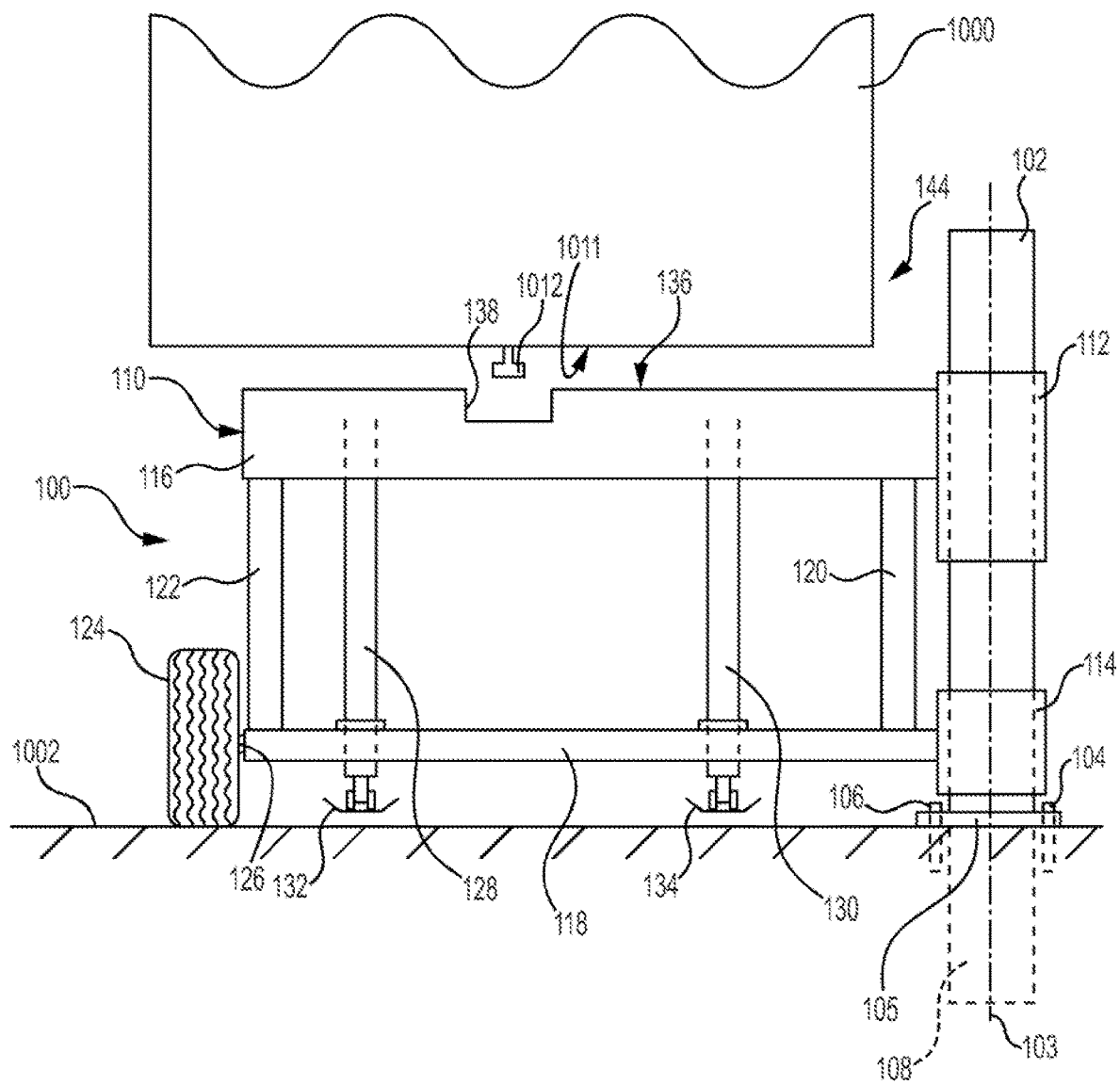
FIG. 3 is a front elevation view of an example stabilizer in a deployed position.
Figure 4:
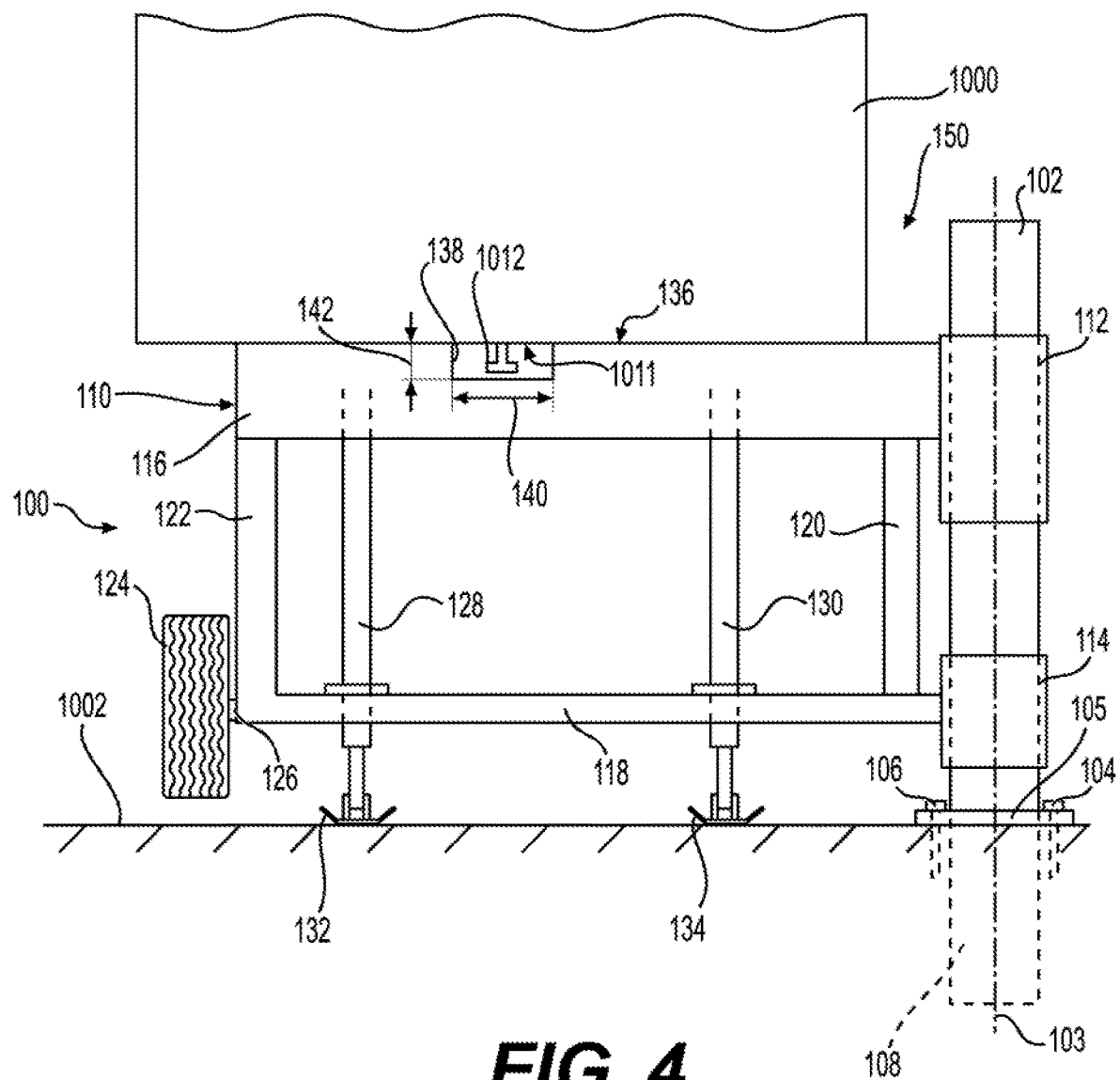
FIG. 4 is front elevation view of an example stabilizer in an engaged position.

FIG. 1 is a side elevation view of an example stabilizer 100 in an engaged position on a trailer 1000, such as a semitrailer; FIG. 2 is a plan view of example stabilizer 100 in an engaged position; FIG. 3 is a front elevation view of example stabilizer 100 in a deployed position; and FIG. 4 is a front elevation view of example stabilizer 100 in an engaged position, all according to at least some aspects of the present disclosure. Generally, stabilizer 100 may be similar in construction and/or operation to other example stabilizers described herein except for the differences noted. Unless explicitly excluded, various example features and methods associated with other example stabilizers described herein may be applicable to stabilizer 100.

Referring to FIGS. 1-4, stabilizer 100 may be disposed on a surface 1002 (e.g., the ground) on which trailer 1000 may be parked at a parking location 1001, such as near an opening 1004 (e.g., a loading dock door) in a building 1006, such as a warehouse. Generally, the portion of the parking location 1001 on which trailer 1000 is parked may be referred to as the footprint of trailer 1000. Arrow 1008 indicates a forward direction with respect to trailer 1000. Stabilizer 100 may be configured to provide trailer stabilization generally near the forward portion of trailer 1000. Trailer 1000 may be parked with its rear door (not shown) generally aligned with opening 1004 so that the contents of trailer 1000 (e.g., cargo) may be loaded from and/or unloaded into building 1006. Trailer 1000 may include landing gear 1016, which may be configured to at least partially support the forward end of trailer 1000, such as when trailer is not coupled to a tractor. A trailer restraint 1003 comprising a repositionable hook 1003a configured to selectively engage trailer 1000 (e.g., a rear impact guard 1000a) may be utilized to prevent unwanted movement of trailer 1000. Trailer restraint 1003 may provide trailer restraint generally near the rear portion of trailer 1000.

In some example embodiments according to at least some aspects of the present disclosure, stabilizer 100 may include a post 102, which may be generally vertical and/or which may be rigidly mounted with respect to surface 1002. For example, post 102 may be secured to some types of surfaces (e.g., concrete) by fasteners, such as one or more bolts 104, 106, extending through a flange 105 on post 102 and into surface 1002. Alternatively or additionally, post 102 may include a buried portion 108 extending into and/or below surface 1002, which may be utilized in connection with surfaces such as asphalt, for example. Post 102 may be generally cylindrical (e.g., a right circular cylinder) and/or may have a generally vertical axis 103.

In some example embodiments according to at least some aspects of the present disclosure, stabilizer 100 may include a frame 110 which may be repositionably coupled to post 102. For example, frame 110 may extend generally horizontally from post 102. Frame 110 may include one or more couplings that may be vertically repositionable with respect to post 102. For example, collars 112, 114 may be rotatably (e.g., in a generally horizontal plane) and/or axially slidably (e.g., generally vertically) disposed on post 102. In the example embodiment shown in FIGS. 1-4, upper collar 112 is positioned on post 102 above lower collar 114.

In some example embodiments according to at least some aspects of the present disclosure, frame 110 may include an upper rail 116 affixed to and/or extending generally horizontally radially from upper collar 112. Similarly, a lower rail 118 may be affixed to and/or extend generally horizontally radially from lower collar 114. One or more vertical frame members 120, 122 may extend generally vertically between upper rail 116 and lower rail 118. In some example embodiments, vertical frame members 120, 122 may keep upper rail 116 and lower rail 118 generally vertically aligned.

In some example embodiments according to at least some aspects of the present disclosure, upper rail 116 may be configured to selectively engage an underside 1011 of trailer 1000. For example, upper rail 116 may include an upper surface 136 arranged to selectively at least partially support underside 1011 of the forward portion of trailer 1000. For example, in the engaged position (FIG. 4), upper surface 136 of upper rail 116 may press against underside 1011 of trailer 1000. Upper rail 116 may include a recess 138, which may be arranged to receive a kingpin 1012, which may extend generally downward from underside 1011 of trailer 1000. In some example embodiments, recess 138 may have a width 140 and/or a depth 142 greater than the corresponding dimensions of kingpin 1012 so that kingpin 1012 may be received within or may pass through recess 138 even if trailer 1000 is parked off center and/or misaligned with respect to a parking spot associated with opening 1004 or other loading dock.

In some example embodiments according to at least some aspects of the present disclosure, stabilizer 100 may include one or more jacks 128, 130, which may be coupled to frame 110 and/or may be configured to lift frame 110 relative to surface 1002. In some example embodiments, jacks 128, 130 may be configured for powered operation. For example, one or more of jacks 128, 130 may include a hydraulic or pneumatic cylinder arranged to extend and retract so that feet 132, 134 may be selectively vertically pressed downward against surface 1002 and/or upper rail 116 may be pressed upward against underside 1011 of trailer 1000. For example, jacks 128, 130 may be configured to wedge jacks 128, 130 and/or frame 110 between underside 1101 of trailer 1000 and surface 1002. Alternatively, one or more electric motors may be used to operate jacks 128, 130 (or other jacks disclosed herein). In some example embodiments, jacks 128, 130 may be configured for hand-driven operation. For example, one or more of jacks 128, 130 may include a hand crank and/or a screw jack.

In some example embodiments, jacks 128, 130 may be spaced-apart along frame 110 so that, for example, jack 128 is radially farther from post 102 than jack 130. In some example embodiments, the spaced-apart positioning of jacks 128, 130 may facilitate stabilizer 100 serving as a stable support for the forward end of trailer 1000.

In some example embodiments according to at least some aspects of the present disclosure, stabilizer 100 may include a support member, such as wheel 124, to at least partially support frame 110 above surface 1002 in at least some positions. Wheel 124 may be disposed on an axle 126 extending from the radially outward end of lower rail 118, for example. In some example embodiments, support members other than wheel 124 may be utilized. For example, a caster and/or a series of ball transfers (e.g., "Hudson bearings") may be substituted for wheel 124 (or other wheels disclosed herein).

Some example embodiments may include a guide rail 1014, such as a tubular rail, which may be positioned generally forward of post 102. Some example guide rails 1014 may prevent or reduce damage caused by a misaligned trailer backing into stabilizer 100.

Referring to FIG. 2, in some example embodiments, stabilizer 100 may be repositionable between a deployed position 144 and a stowed position 146 (shown with dashed lines). For example, stabilizer 100 may be rotatable about axis 103 of post 102 between a deployed position 144 and a stowed position 146. In some example embodiments configured for powered operation, a hydraulic cylinder 152 may provide a motive force for rotating frame 110 about axis 103. Alternatively, a pneumatic cylinder and/or an electric motor may be used to rotate frame 110 about axis 103 (or other frames disclosed herein). In some example embodiments, frame 110 may be manually rotated about axis 103, such as between deployed position 144 and stowed position 146. For example, frame 110 may be substantially freely rotatable so that it may be pushed and/or pulled into the desired position by hand. In some example embodiments, stabilizer 100 may include a hand-driven mechanism arranged to rotate frame 110 (e.g., a crank and gearbox mechanism, hand crank and worm drive mechanism, hand crank and leadscrew mechanism, etc.).

In stowed position 146, frame 110 of stabilizer 100 may be aligned generally parallel with a front-to-rear centerline of trailer 1000. In stowed position 146, stabilizer 100 may be substantially clear of the path that trailer 1000 would travel to reach a parking location adjacent opening 1004 of building 1006 (FIG. 1) for loading and/or unloading. Similarly, in stowed position 146, stabilizer 100 may be substantially clear of the path that trailer 1000 would travel to leave the parking location adjacent opening 1004 of building 1006 (FIG. 1) after loading and/or unloading.

In some example embodiments, to reach deployed position 144 from stowed position 146, frame 110 may rotate approximately 90 degrees counter-clockwise as indicated by angle of rotation 148. In deployed position 144, frame 110 may be at least partially beneath trailer 1000. King pin 1012 may be generally over recess 138 in upper rail 116 and/or underside 1011 of trailer 1000 may be at least partially above upper surface 136 of upper rail 116.

As shown in FIG. 3, in some example embodiments, in deployed position 144, upper surface 136 of upper rail 116 may be substantially lower than underside 1011 of trailer 1000. In particular, underside 1011 of trailer may be disposed substantially vertically spaced apart from upper surface 136 of upper rail 116. Accordingly, frame 110 may be rotated between stowed position 146 and deployed position 144 without striking trailer 1000.

Referring to FIGS. 3 and 4, in some example embodiments, stabilizer 100 may be operated between deployed position 144 (FIG. 3) and an engaged position 150 (FIG. 4) by actuation of jacks 128, 130. For example, starting in deployed position 144 (FIG. 3), jacks 128, 130 may be extended, which may cause feet 132, 134 to press against surface 1002. Further extension of jacks 128, 130 may lift frame 110 vertically upward, which may lift wheel 124 off of surface 1002 and/or may cause collars 112, 114 to slide axially vertically upward on post 102. Extension of jacks 128, 130, lifting frame 110, may cause upper surface 136 of upper rail to contact underside 1011 of trailer 1000. Extension of jacks 128, 130 when upper rail 116 is in contact with trailer 1000 and feet 132, 134 are in contact with surface 1002 may cause stabilizer 100 to securely engage trailer 1000 and/or support at least some of the weight of trailer 1000. For example, the forward end of trailer 1000 may be at least partially supported by stabilizer 100 and/or landing gear 1016 (FIG. 1) may be at least partially unloaded.

Some example embodiments as shown in FIGS. 1-4 may be operated as follows. Trailer 1000 may be maneuvered into position and parked on surface 1002 in location 1001 associated with opening 1004 in building 1006, such as by a yard truck coupled to king pin 1012 of trailer 1000. The yard truck may disconnect from trailer 1000. Frame 110 may be pivoted from the stowed position to the deployed position. Jacks 128, 130 may be extended to lift frame 110 above surface 1002. Frame 110 may reach the engaged position when upper surface 136 of upper rail 116 is in contact with lower surface 1011 of trailer. After loading and/or unloading of trailer 1000 is complete, frame 110 may be disengaged from trailer by retracting jacks 128, 130. Then, frame 110 may be pivoted from the deployed position to the stowed position. With frame 110 in the stowed position, trailer 1000 may be coupled to a tractor or yard truck and moved to another location.

Figure 5:
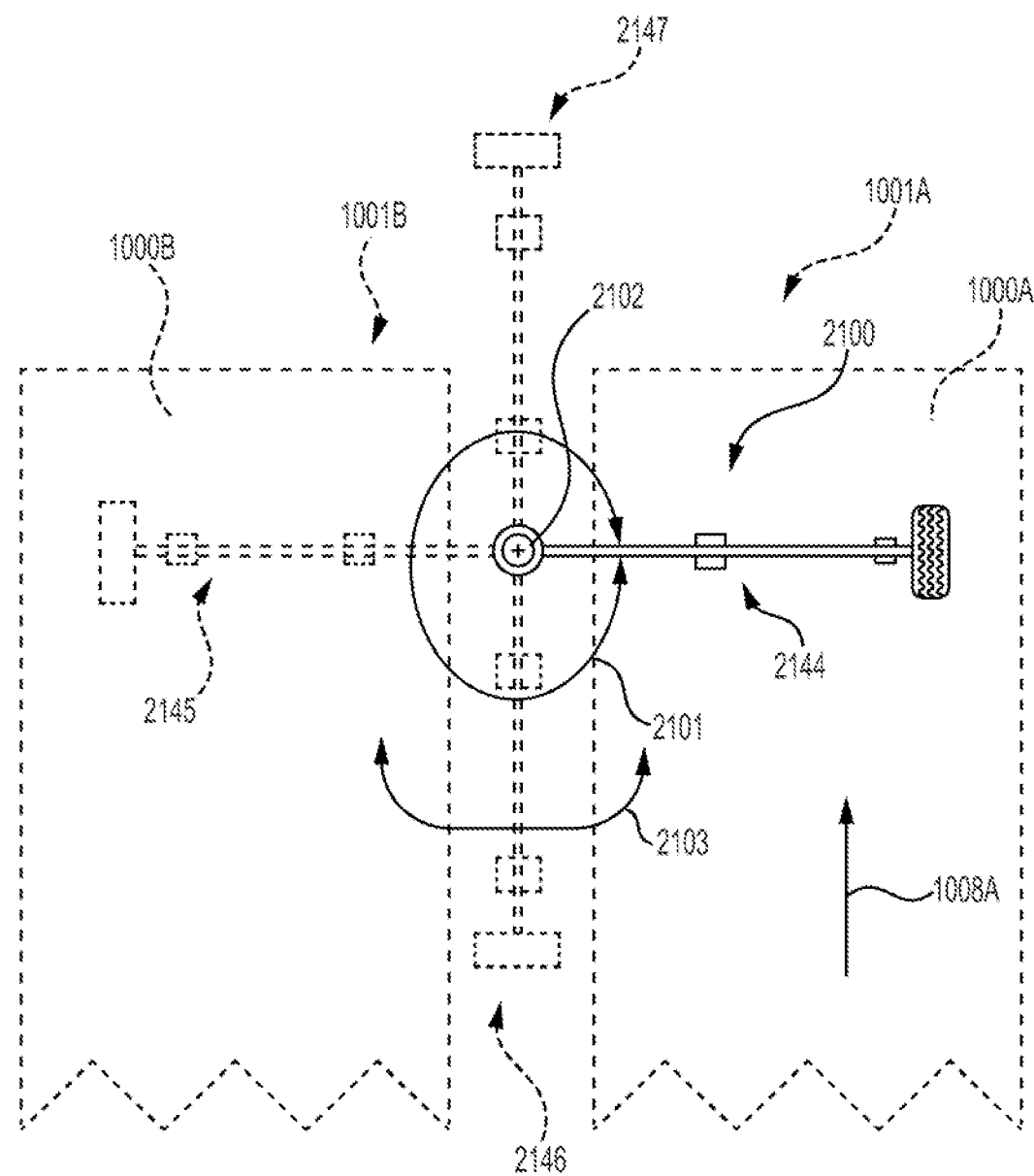
FIG. 5 is a plan view of an example stabilizer configured for additional rotation.

FIG. 5 is a plan view of an example stabilizer 2100 configured for additional rotation, according to at least some aspects of the present disclosure. Generally, stabilizer 2100 may be similar in construction and/or operation to other example stabilizers described herein except for the differences noted. Unless explicitly excluded, various example features and methods associated with other example stabilizers described herein may be applicable to stabilizer 2100. In some example embodiments, stabilizer 2100 may be configured for up to about 360 degrees of rotation (shown as angle 2101), clockwise and/or counterclockwise, around post 2102. For example, stabilizer 2100 may be rotatable between a rear stowed position 2146, a first (right) deployed position 2144, a forward stowed position 2147, and/or a second (left) deployed position 2145. Accordingly, stabilizer 2100 may be selectively engaged with a first trailer 1000A and/or a second trailer 1000B in adjacent first parking location 1001A and second parking location 1001B, respectively, such as at adjacent loading dock doors on a warehouse. Arrow 1008A indicates a forward direction with respect to trailers 1000A, 1000B.

In some alternative example embodiments, stabilizer 2100 may be configured for up to about 180 degrees of rotation (shown as angle 2103), clockwise and/or counterclockwise, around post 2102. For example, stabilizer 2100 may be rotatable between rear stowed position 2146, first (right) deployed position 2144, and/or second (left) deployed position 2145. Accordingly, stabilizer 2100 may be selectively engaged with a first trailer 1000A and/or a second trailer 1000B in adjacent first parking location 1001A and second parking location 1001B, such as at adjacent loading dock doors on a warehouse. Some such embodiments configured for up to about 180 degrees of rotation may include a guide rail generally similar to guide rail 1014 (FIGS. 1 and 2) extending generally forward from post 2102.

In an alternative example tandem configuration, two stabilizers (e.g., two stabilizers 2100) may be positioned between adjacent first parking location 1001A and second parking location 1001B, one forward of the other. The forward of the two stabilizers 2100 may be configured to service one of the parking locations 1001A, 1001B and/or the rearward of the two stabilizers 2100 may be configured to service the other of the two parking locations 1001A, 1001B. In another alternative example configuration, a single post between two parking locations 1001A, 1001B may be used with two stabilizers 2100.

Figure 6:
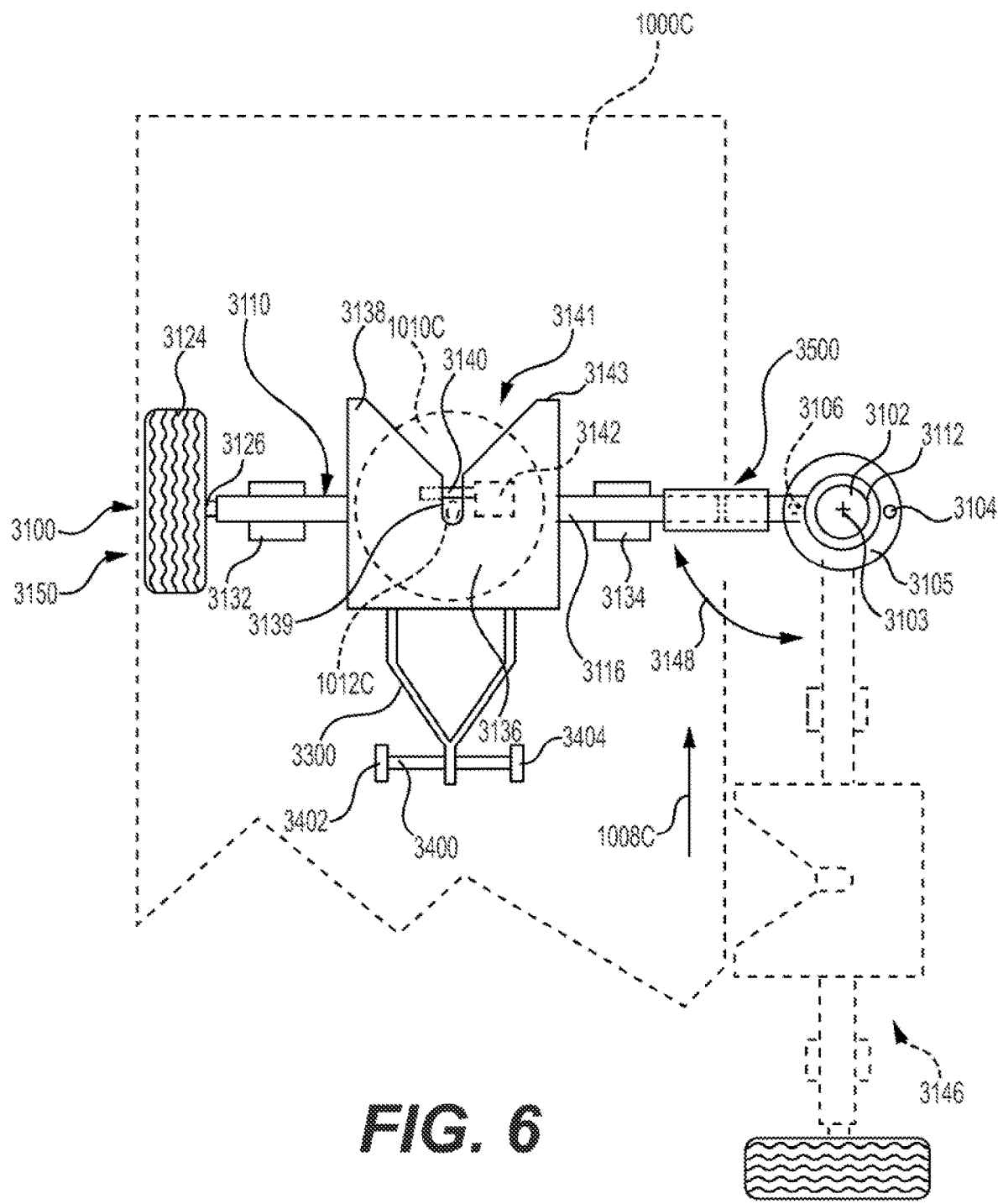
FIG. 6 is a plan view of an example stabilizer including a fifth wheel plate engaged with a trailer.
Figure 7:
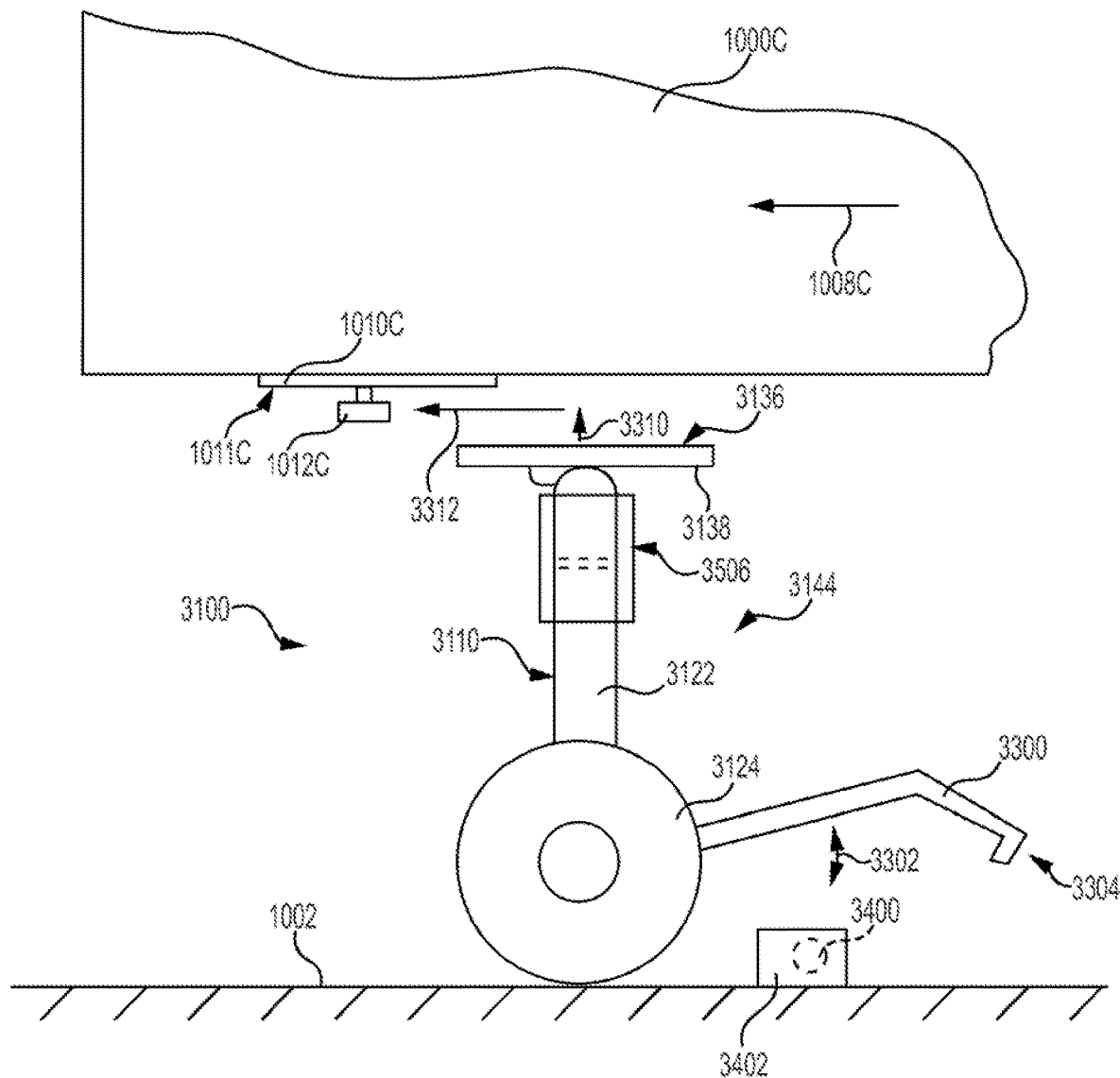
FIG. 7 is a left side elevation view of an example stabilizer in a deployed position.
Figure 8:
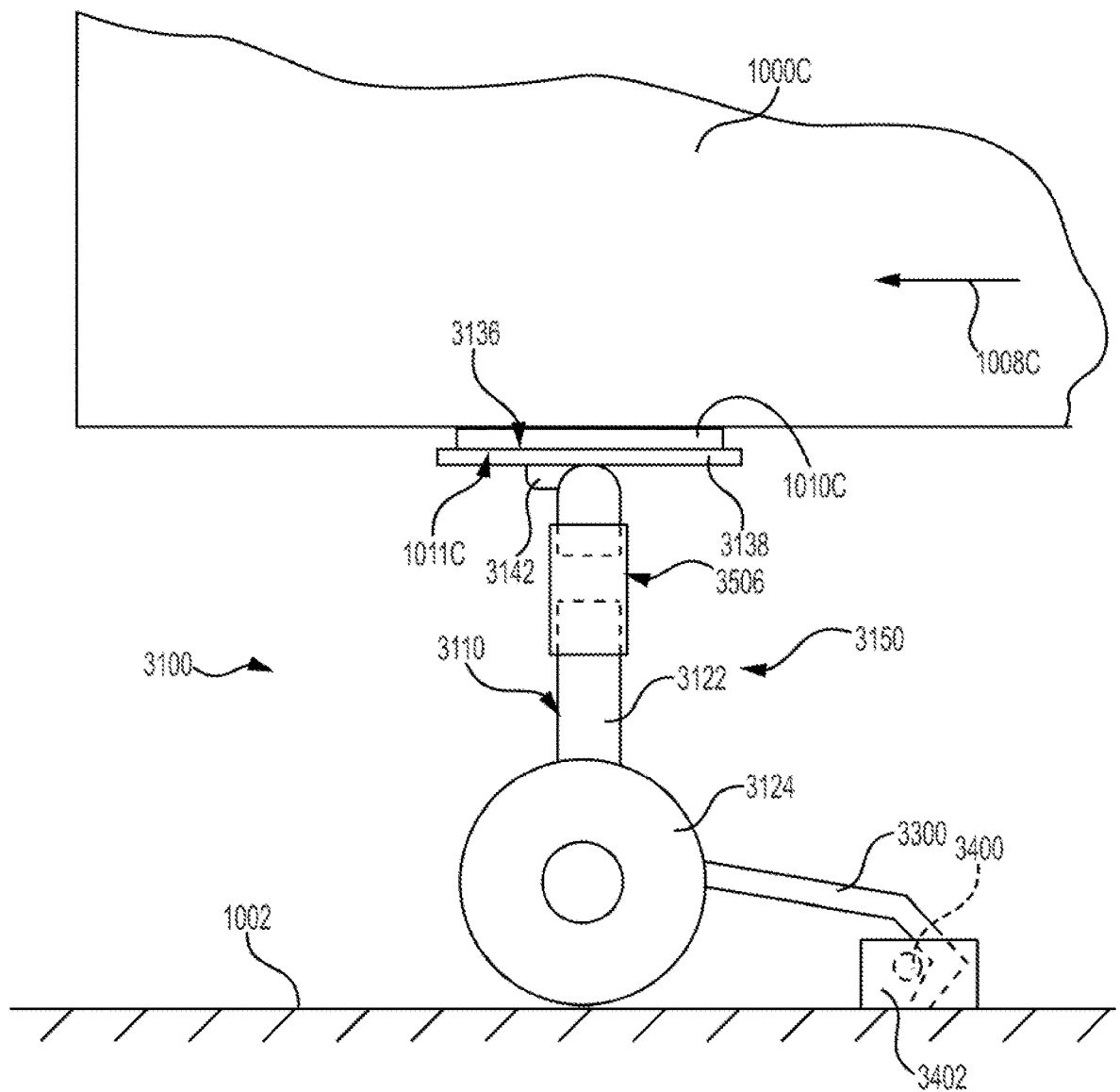
FIG. 8 is a left side elevation view of an example stabilizer engaged with a trailer.
Figure 9:
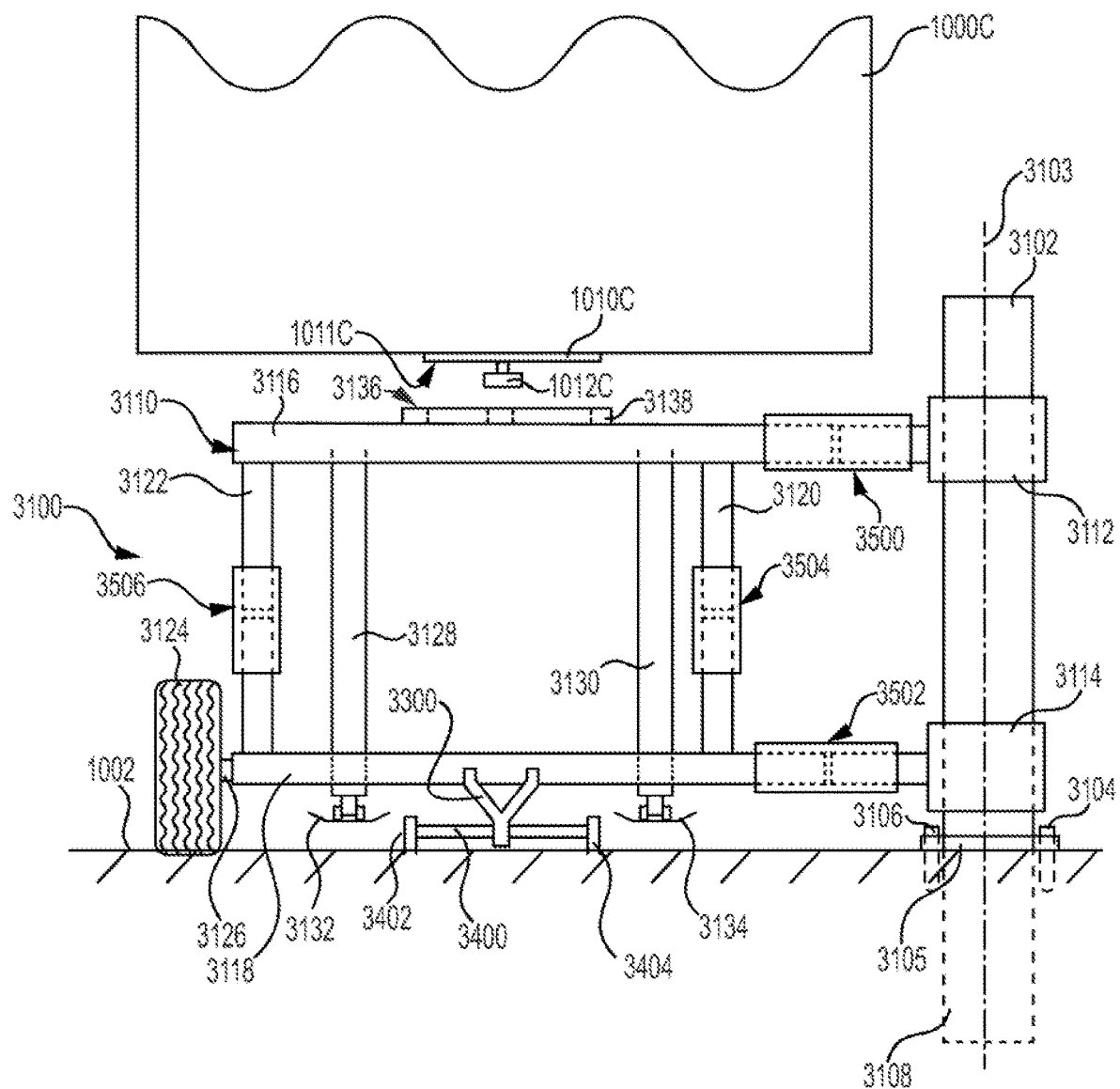
FIG. 9 is a rear elevation view of an example stabilizer in the deployed position.

FIG. 6 is a plan view of example stabilizer 3100 including a fifth wheel plate 3138 engaged with a trailer 1000C; FIG. 7 is a left side elevation view of example stabilizer 3100 in a deployed position; FIG. 8 is a left side elevation view of example stabilizer 3100 engaged with trailer 1000C; FIG. 9 is a rear elevation view of example stabilizer 3100 in the deployed position of FIG. 7, all according to at least some aspects of the present disclosure. Generally, stabilizer 3100 may be similar in construction and/or operation to other example stabilizers described herein except for the differences noted. Unless explicitly excluded, various example features and methods associated with other example stabilizers described herein may be applicable to stabilizer 3100.

Referring to FIGS. 6-9, stabilizer 3100 may be disposed on surface 1002 on which trailer 1000C may be parked, such as near an opening (e.g., a loading dock door) in a building, such as a warehouse. Arrow 1008C indicates a forward direction with respect to trailer 1000C. Trailer 1000 may be parked with its rear door (not shown) generally aligned with a loading dock door so that the contents of trailer 1000C (e.g., cargo) may be loaded from and/or unloaded into building 1006. Trailer 1000C may include landing gear, which may be configured to at least partially support the forward end of trailer 1000C, such as when trailer is not coupled to a tractor.

In some example embodiments according to at least some aspects of the present disclosure, stabilizer 3100 may include a post 3102, which may be generally vertical and/or which may be rigidly mounted with respect to surface 1002. For example, post 3102 may be secured to some types of surfaces (e.g., concrete) by fasteners, such as one or more bolts 3104, 3106, extending through a flange 3105. Alternatively or additionally, post 3102 may include a buried portion 3108 extending into and/or below surface 1002, which may be utilized in connection with surfaces such as asphalt, for example. Post 3102 may be generally cylindrical (e.g., a right circular cylinder) and/or may have a generally vertical axis 3103.

In some example embodiments according to at least some aspects of the present disclosure, stabilizer 3100 may include a frame 3110 repositionably coupled to post 3102. For example, frame 3110 may extend generally horizontally from post 3102. Frame 3110 may include one or more couplings, such as collars 3112, 3114, which may be vertically repositionable with respect to post 3102. For example, collars 3112, 3114 may be rotatably (e.g., in a generally horizontal plane) and/or axially slidably (e.g., generally vertically) disposed on post 3102. In the example embodiment shown in FIGS. 6-9, upper collar 3112 is positioned on post 3102 above lower collar 3114.

In some example embodiments according to at least some aspects of the present disclosure, frame 3110 may include an upper rail 3116 affixed to and/or extending generally horizontally radially from upper collar 3112. Similarly, a lower rail 3118 may be affixed to and/or extend generally horizontally radially away from lower collar 3114. One or more vertical frame members 3120, 3122 may extend generally vertically between upper rail 3116 and lower rail 3118. In some example embodiments, vertical frame members 3120, 3122 may keep upper rail 3116 and lower rail 3118 generally vertically aligned.

In some example embodiments according to at least some aspects of the present disclosure, stabilizer 3100 may include a generally upwardly facing fifth wheel plate 3138 for selectively engaging an king pin plate 1010C and/or a downwardly extending king pin 1012C, which may be disposed on the underside of the forward portion of trailer 1000C. For example, in the engaged position (FIGS. 6 and 8) an upper surface 3136 of fifth wheel plate 3138 may press against a lower surface 1011C of king pin plate 1010C. Fifth wheel plate 3138 may include a slot 3139 arranged to receive kingpin 1012C. In some example embodiments, a retractable bolt 3140 (or other similar locking mechanism), which may be extended and/or retracted by an actuator 3142, may be arranged to capture kingpin 1012C in slot 3139 when bolt 3140 is extended. Actuator 3142 may retract bolt 3140 substantially clear of slot 3139 to facilitate engagement of kingpin 1012C with and/or disengagement of kingpin 1012C from slot 3139 when desired. Some example fifth wheel plates 3138 may include a tapered opening 3141, which may taper from a generally wide mouth at a forward end 3143 of fifth wheel plate 3138 to about the width of slot 3139 where it joins slot 3139. In operation, tapered opening 3141 may facilitate alignment of slot 3139 with king pin 1012C as frame 3110 is moved into engagement with trailer 1000C.

In some example embodiments according to at least some aspects of the present disclosure, stabilizer 3100 may include one or more jacks 3128, 3130, which may be configured to wedge jacks 3128, 3130 and/or frame 3110 between the underside of trailer 1000C and surface 1002. For example, jacks 3128, 3130 may be configured to lift frame 3110 above surface 1002. In some example embodiments, jacks 3128, 3130 may be configured for powered operation. For example, one or more of jacks 3128, 3130 may include a hydraulic or pneumatic cylinder arranged to extend and retract so that feet 3132, 3134 may be selectively vertically pressed downward against surface 1002. Alternatively, one or more electric motors may be used to operate jacks 3128, 3130. In some example embodiments, jacks 3128, 3130 may be configured for hand-driven operation. For example, one or more of jacks 3128, 3130 may include a hand crank and/or a screw jack.

Jacks 3128, 3130 may be spaced-apart along frame 3110 so that, for example, jack 3128 is radially farther from post 3102 than jack 3130. In some example embodiments, the spaced-apart positioning of jacks 3128, 3130 may facilitate stabilizer 3100 serving as a stable support for the forward end of trailer 1000C.

In some example embodiments according to at least some aspects of the present disclosure, stabilizer 3100 may include a support member, such as wheel 3124, to at least partially support frame 3110 above surface 1002 in at least some positions. Wheel 3124 may be disposed on an axle 3126 extending from the radially outward end of lower rail 3118, for example.

Referring to FIG. 6, in some example embodiments, stabilizer 3100 may be rotatable about axis 3103 of post 3102 between a deployed position 3144 and a stowed position 3146 (shown with dashed lines). For example, in some example embodiments configured for powered operation, a hydraulic cylinder may provide a motive force for rotating frame 3110. Alternatively, a pneumatic cylinder and/or an electric motor may be used to rotate frame 3110 about axis 3103. In some example embodiments, frame 3110 may be manually rotated between deployed position 3144 and stowed position 3146. For example, frame 3110 may be substantially freely rotatable so that it may be pushed and/or pulled into the desired position by hand. In some example embodiments, stabilizer 3100 may include a hand-driven mechanism arranged to rotate frame 3110 (e.g., a crank and gearbox mechanism, hand crank and worm drive mechanism, hand crank and leadscrew mechanism, etc.).

In stowed position 3146, frame 3110 of stabilizer 3100 may be aligned generally parallel with a front-to-rear centerline of trailer 1000C. In stowed position 3146, stabilizer 3100 may be substantially clear of the path that trailer 1000C would travel to reach a parking location for loading and/or unloading (e.g., adjacent a loading dock door). Similarly, in stowed position 3146, stabilizer 3100 may be substantially clear of the path that trailer 1000C would travel to leave the parking location after loading and/or unloading (e.g., adjacent a loading dock door).

In some example embodiments, to reach deployed position 3144 from stowed position 3146, frame 3110 may rotate approximately 90 degrees clockwise as indicated by angle of rotation 3148. In deployed position 3144, frame 3110 may be at least partially beneath trailer 1000C so that king pin 1012C may be captured in slot 3139 in fifth wheel plate 3138 and/or king pin plate 1010C may be at least partially above upper surface 3136 of fifth wheel plate 3138 as stabilizer 3100 is engaged with trailer 1000C.

As shown in FIG. 7, in some example embodiments, in deployed position 3144, upper surface 3136 of fifth wheel plate 3138 may be substantially lower than the underside of trailer 1000C. In particular, upper surface 3136 of fifth wheel plate 3138 may be disposed substantially vertically spaced apart below lower surface 1011C of king pin plate 1010C. Accordingly, frame 3110 may be rotated between stowed position 3146 and deployed position 3144 without striking trailer 1000C.

In some example embodiments according to at least some aspects of the present disclosure, stabilizer 3100 may be configured to engage trailers 1000C that may be parked off center and/or misaligned with respect to a parking spot associated with the loading dock door. For example, frame 3110 may include one or more telescoping sections 3500, 3502, 3504, 3506 which may facilitate lateral position and/or height adjustment of fifth wheel plate 3138 with respect to king pin plate 1010C of trailer 1000C. In some example embodiments, upper rail 3116 and/or lower rail 3118 may include telescoping sections 3500, 3502, respectively, which may allow generally horizontal extension of frame 3110, such as for lateral alignment of fifth wheel plate 3138 with respect to king pin plate 1010C. Similarly, vertical frame members 3120, 3122 may include telescoping sections 3504, 3506, respectively, which may allow for generally vertical extension of frame 3110, such as for height alignment of fifth wheel plate 3138 with respect to king pin 1010C. Telescoping sections 3500, 3502, 3504, 3506 may be extended and/or retracted manually, electrically, pneumatically, and/or hydraulically, for example.

In some example embodiments according to at least some aspects of the present disclosure, stabilizer 3100 may include a repositionable connector 3300 configured to selectively engage an anchor 3400 secured to surface 1002. In some example embodiments, connector 3300 may include a generally hook-shaped portion 3304 that may be arranged to selectively couple with a generally horizontal rod-shaped anchor 3400. Anchor 3400 may be mounted to surface 1002 by blocks 3402, 3404, for example. Some example embodiments may include a plurality of anchors 3400 spaced apart longitudinally with respect to trailer 1000C to accommodate trailers of different lengths and/or trailer positioning differences. Generally, connector 3300 may be pivotably mounted to frame 3110 (e.g., to lower rail 3118) so that connector 3300 may pivot upward and downward as shown by angle 3302 (FIG. 7). In some example embodiments, connector 3300 may be manually, hydraulically, pneumatically, and/or electrically repositionable.

In some example embodiments, connector 3300 may be repositionable between a raised position (FIG. 7) and a lowered position (FIG. 8). In the raised position, hook-shaped portion 3304 may be substantially above anchor 3400 so that connector 3300 does not engage anchor 3400. In the lowered position, hook-shaped portion 3304 may be at approximately the same height as anchor 3400 so that when frame 3110 is rotated to the deployed position and fifth wheel plate 3138 is engaged with king pin 1012C, hook-shaped portion 3304 may engage anchor 3400. With connecter 3300 engaged with anchor 3400 and king pin 1012C engaged with fifth wheel plate 3138, trailer 1000C may be substantially secured against forward movement.

In some example embodiments, stabilizer 3100 may be operated between deployed position 3144 (FIG. 7) and engaged position 3150 (FIGS. 6 and 8) by aligning fifth wheel plate 3138 with king pin plate 1010C so that king pin 1012C is captured in slot 3139 by bolt 3140. For example, starting in deployed position 3144 (FIG. 7), fifth wheel plate 3138 may be raised (e.g., arrow 3310) and/or translated (e.g., arrow 3312) to contact fifth wheel plate 3138 with king pin 1010C and/or king pin 1012C (see, e.g., FIG. 8). Additionally, connector 3300 may be lowered so that hook portion 3304 engages anchor 3400. Once fifth wheel plate 3138 is engaged with king pin plate 1010C, jacks 3128, 3130 may be extended, which may cause feet 3132, 3134 to press against surface 1002. Further extension of jacks 3128, 3130 may lift frame 3110 vertically upward, which may lift wheel 3124 off of surface 1002 and/or may cause collars 3112, 3114 to slide axially vertically upward on post 3102. Extension of jacks 3128, 3130 when fifth wheel plate 3138 is in contact with king pin plate 1010C and feet 3132, 3134 are in contact with surface 1002 may cause stabilizer 3100 to support at least some of the weight of trailer 1000C. For example, the forward end of trailer 1000C may be at least partially supported by stabilizer 3100 and/or the landing gear may be at least partially unloaded.

Some example embodiments as shown in FIGS. 6-9 may be operated as follows. Trailer 1000C may be maneuvered into position and parked on surface 1002 in a location associated with an opening in building, such as by a yard truck. The yard truck may disconnect from trailer 1000C. Frame 3110 may be pivoted from the stowed position to the deployed position. One or more of telescoping sections 3500, 3502, 3504, 3506 may be extended and/or retracted to horizontally and/or vertically align fifth wheel plate 3138 with king pin plate 1010C. In particular, slot 3139 may be aligned with king pin 1012C. Frame 3110 may be further rotated to engage fifth wheel plate 3138 with king pin plate 1010C. Jacks 3128, 3130 may be extended to lift frame 3110 above surface 1002. After loading and/or unloading of trailer 1000 is complete, frame 3110 may be disengaged from trailer by retracting jacks 3128, 3130 and/or uncoupling fifth wheel plate 3138 from king pin plate 1010C. Then, frame 3110 may be pivoted from the deployed position to the stowed position. With frame 3110 in the stowed position, trailer 1000C may be coupled to a tractor or yard truck and moved to another location.

Figure 10:
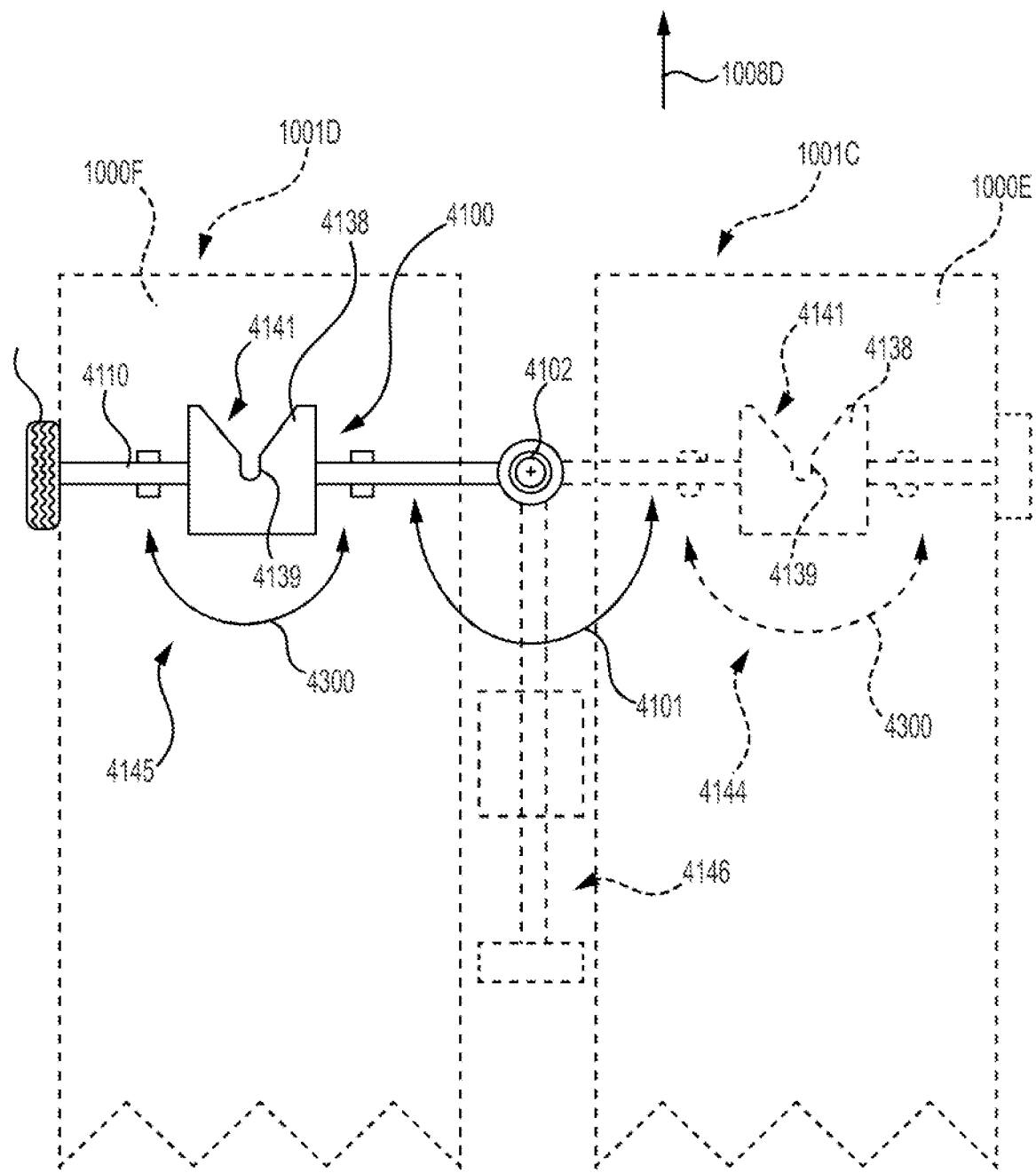
FIG. 10 is a plan view of an alternative example stabilizer including a rotatable fifth wheel plate.

FIG. 10 is a plan view of an alternative example stabilizer 4100 including a rotatable fifth wheel plate 4138, according to at least some aspects of the present disclosure. Generally, stabilizer 4100 may be similar in construction and/or operation to other example stabilizers described herein except for the differences noted. Unless explicitly excluded, various example features and methods associated with other example stabilizers described herein may be applicable to stabilizer 4100.

In some example embodiments, stabilizer 4100 may be configured for up to about 180 degrees of rotation (shown as angle 4101), clockwise and/or counterclockwise, around post 4102. For example, stabilizer 4100 may be rotatable between a rear stowed position 4146, a first (right) deployed position 4144, and/or a second (left) deployed position 4145. Accordingly, stabilizer 4100 may be selectively engaged with a first trailer 1000E and/or a second trailer 1000F in adjacent first parking location 1001C and second parking location 1001D, respectively, such as at adjacent loading dock doors on a warehouse. Arrow 1008D indicates a forward direction with respect to trailers 1000E, 1000F. Some such embodiments configured for up to about 180 degrees of rotation may include a guide rail generally similar to guide rail 1014 (FIGS. 1 and 2) extending generally forward from post 4102. In some alternative example embodiments, stabilizer 4100 may be configured for up to about 90 degrees of rotation, clockwise and/or counterclockwise, similar to the embodiment shown in FIG. 2 and/or for up to about 360 degrees of rotation, clockwise and/or counterclockwise, similar to the embodiment shown in FIG. 5.

In some example embodiments, fifth wheel plate 4138 may be rotatable at least about 180 degrees in a generally horizontal plane relative to other portions of frame 4110, as indicated by angle 4300. For example, in second (left) deployed position 4145, fifth wheel plate 4138 may be rotated so that tapered opening 3141 may be oriented generally forward, which may facilitate alignment of slot 4139 with the king pin of trailer 1000F as frame 4110 is rotated clockwise. Similarly, in first (right) deployed position 4144, fifth wheel plate 4138 may be rotated so that tapered opening 3141 may be oriented generally forward, which may facilitate alignment of slot 4139 with the king pin of trailer 1000E as frame 4110 is rotated counter-clockwise. Accordingly, stabilizer 4100 may be selectively engaged with trailers in adjacent parking locations 1001C, 1001D.

Figure 11:
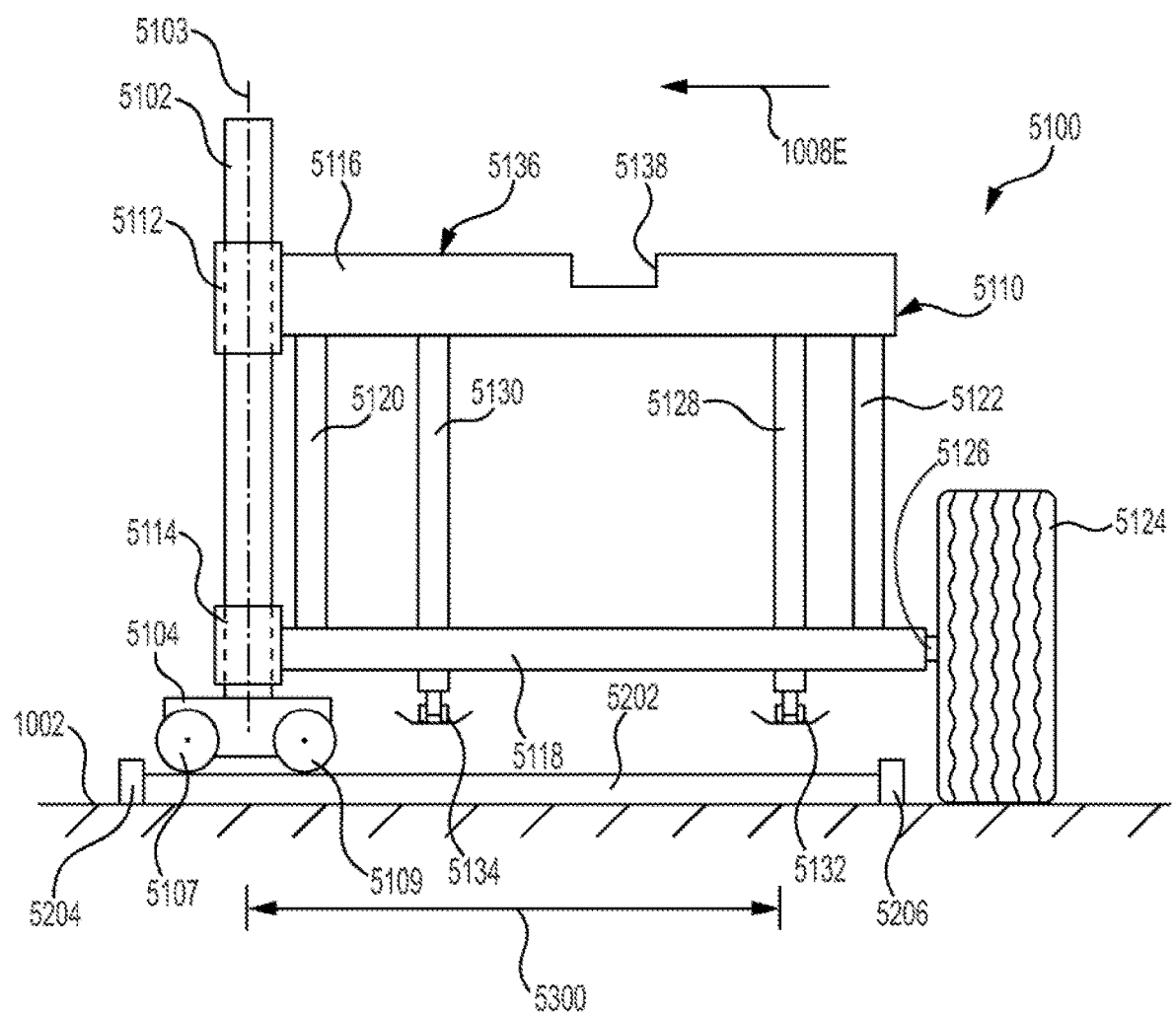
FIG. 11 is a left elevation view of an example stabilizer including a movable post.
Figure 12:
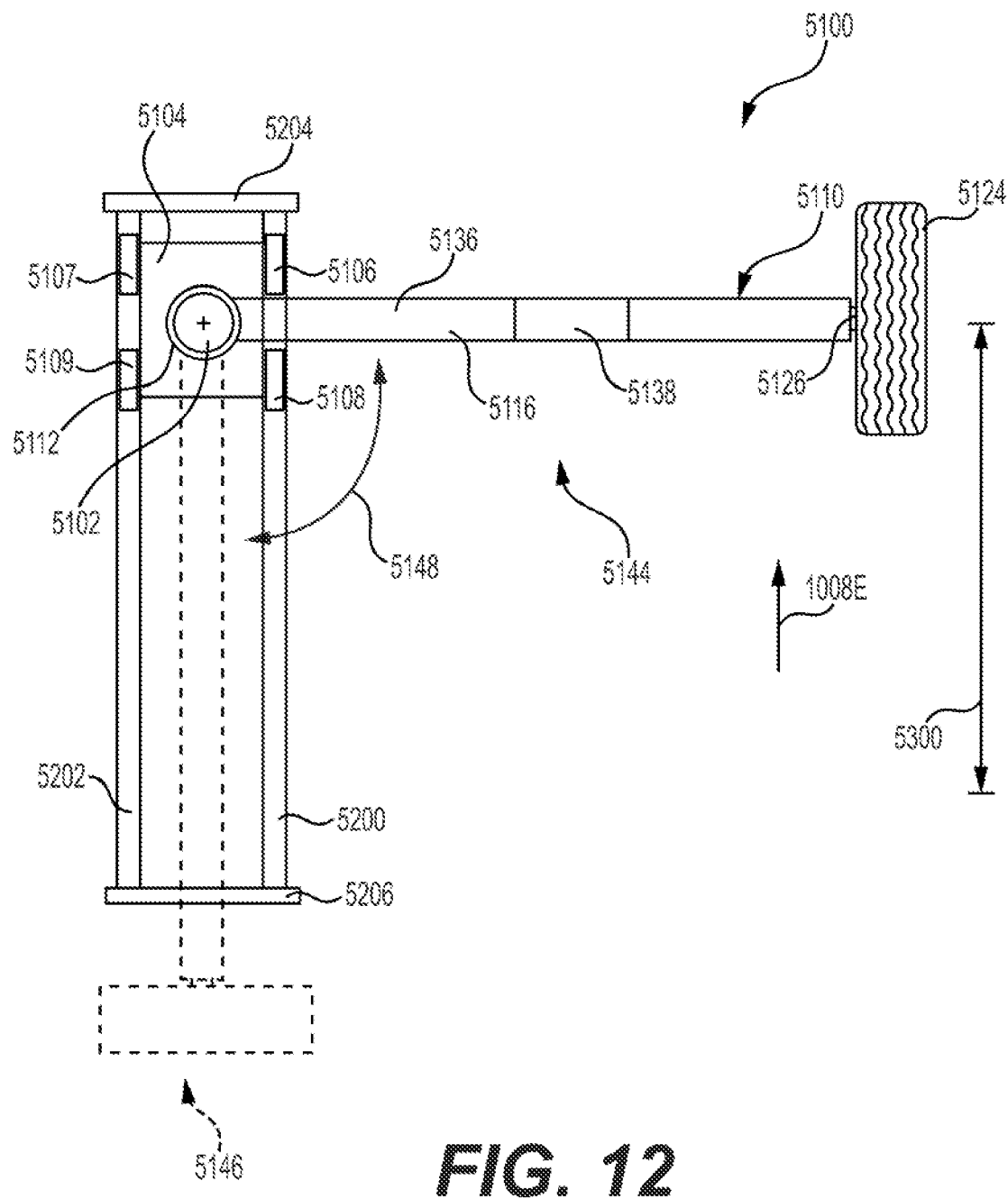
FIG. 12 is a plan view of an example stabilizer.

FIG. 11 is a left elevation view of an example stabilizer 5100 including a movable post 5102 and FIG. 12 is a plan view of example stabilizer 5100, all according to at least some aspects of the present disclosure. Generally, stabilizer 5100 may be similar in construction and/or operation to other example stabilizers described herein except for the differences noted. Unless explicitly excluded, various example features and methods associated with other example stabilizers described herein may be applicable to stabilizer 5100.

Referring to FIGS. 11 and 12, stabilizer 5100 may be configured to accommodate trailers of different lengths by moving post 5102 generally forward and/or rearward with respect to the trailer. Stabilizer 5100 may be disposed on surface 1002 on which a trailer may be parked, such as near an opening (e.g., a loading dock door) in a building, such as a warehouse. Arrow 1008E indicates a forward direction with respect to the trailer. Generally, stabilizer 5100 may be configured for longitudinal movement with respect to the trailer, such as to accommodate trailers of different lengths. For example, standard trailer lengths may include about 48 feet and about 53 feet. Accordingly, stabilizer 5100 may be configured to move a longitudinal distance 5300 that at least allows stabilizer 5100 to properly engage 48 foot and 53-foot trailers. That is, post 5102 may be movable closer to and/or farther away from the associated loading dock.

In some example embodiments according to at least some aspects of the present disclosure, stabilizer 5100 may include post 5102, which may be generally vertical and/or which may be movably disposed on surface 1002. For example, post 5102 may be secured to a carriage 5104, which may be movable relative to surface 1002. In some example embodiments carriage 5104 may include wheels 5106, 5107, 5108, 5019, which may be rollable on tracks 5200, 5202 secured to surface 1002. In some example embodiments, tracks 5200, 5202 may extend in a generally forward-rearward orientation with respect to the trailer, which may facilitate movement of post 5102 to accommodate trailers of different lengths. Tracks 5200, 5202 may be mounted to cross ties 5204, 5206, which may prevent movement of carriage 5104 beyond the forward and/or rearward ends of tracks 5200, 5202. Post 5102 may be generally cylindrical (e.g., a right circular cylinder) and/or may have a generally vertical axis 5103.

In some example embodiments according to at least some aspects of the present disclosure, stabilizer 5100 may include a frame 5110 repositionably coupled to post 5102.

For example, frame 5110 may extend generally horizontally from post 5102. Frame 5110 may include one or more couplings, such as collars 5112, 5114, which may be vertically repositionable with respect to pot 5102. For example, collars 5112, 5114 may be rotatably (e.g., in a generally horizontal plane) and/or axially slidably (e.g., generally vertically) disposed on post 5102. In the example embodiment shown in FIGS. 11 and 12, upper collar 5112 is positioned on post 5102 above lower collar 5114.

In some example embodiments according to at least some aspects of the present disclosure, frame 5110 may include an upper rail 5116 affixed to and/or extending generally horizontally radially from upper collar 5112. Similarly, a lower rail 5118 may be affixed to and/or extend generally horizontally radially away from lower collar 5114. One or more vertical frame members 5120, 5122 may extend generally vertically between upper rail 5116 and lower rail 5118. In some example embodiments, vertical frame members 5120, 5122 may keep upper rail 5116 and lower rail 5118 generally vertically aligned.

In some example embodiments according to at least some aspects of the present disclosure, upper rail 5116 may be configured to selectively engage an underside of the trailer. For example, upper rail 5116 may include an upper surface 5136 arranged to selectively at least partially support the underside of the forward portion of the trailer. For example, in an engaged position, upper surface 5136 of upper rail 5116 may press against the underside of the trailer. Upper rail 5116 may include a recess 5138, which may be arranged to receive a kingpin, which may extend generally downward from the underside of the trailer. In some example embodiments, recess 5138 may have a width and/or a depth greater than the corresponding dimensions of the kingpin so that the kingpin may be received within or may pass through recess 5138 even if the trailer is parked off center and/or misaligned with respect to a parking spot associated with the loading dock.

In some example embodiments according to at least some aspects of the present disclosure, stabilizer 5100 may include one or more jacks 5128, 5130 coupled to frame 5110, which may be configured wedge jacks 5128, 5130 and/or frame 5110 between the underside of the trailer and surface 1002. For example, jacks 5128, 5130 may be configured to lift frame 5110 relative to surface 1002. In some example embodiments, jacks 5128, 5130 may be configured for powered operation. For example, one or more of jacks 5128, 5130 may include a hydraulic or pneumatic cylinder arranged to extend and retract so that feet 5132, 5134 may be selectively vertically pressed downward against surface 1002 and/or upper rail 5116 may be pressed upward against the underside of the trailer. Alternatively, one or more electric motors may be used to operate jacks 5128, 5130. In some example embodiments, jacks 5128, 5130 may be configured for hand-driven operation. For example, one or more of jacks 5128, 5130 may include a hand crank and/or a screw jack.

Jacks 5128, 5130 may be spaced-apart along frame 5110 so that, for example, jack 5128 is radially farther from post 5102 than jack 5130. In some example embodiments, the spaced-apart positioning of jacks 5128, 5130 may facilitate stabilizer 5100 serving as a stable support for the forward end of the trailer.

In some example embodiments according to at least some aspects of the present disclosure, stabilizer 5100 may include a support member, such as wheel 5124, to at least partially support frame 5110 above surface 1002 in at least some positions. Wheel 5124 may be disposed on an axle 5126 extending from the radially outward end of lower rail 5118, for example.

In some example embodiments, stabilizer 5100 may be rotatable about axis 5103 of post 5102 between a deployed position 5144 and a stowed position 5146 (shown with dashed lines). For example, in some example embodiments configured for powered operation, a hydraulic cylinder may provide a motive force for rotating frame 5110 about axis 5103. Alternatively, a pneumatic cylinder and/or an electric motor may be used to rotate frame 5110 about axis 5103. In some example embodiments, frame 5110 may be manually rotated about axis 5103, such as between deployed position 5144 and stowed position 5146. For example, frame 5110 may be substantially freely rotatable so that it may be pushed and/or pulled into the desired position by hand. In some example embodiments, stabilizer 5100 may include a hand-driven mechanism arranged to rotate frame 5110 (e.g., a crank and gearbox mechanism, hand crank and worm drive mechanism, hand crank and leadscrew mechanism, etc.).

In stowed position 5146, frame 5110 of stabilizer 5100 may be aligned generally parallel with a front-to-rear centerline of the trailer. In stowed position 5146, stabilizer 5100 may be substantially clear of the path that the trailer would travel to reach a parking location adjacent for loading and/or unloading. Similarly, in stowed position 5146, stabilizer 5100 may be substantially clear of the path that the trailer would travel to leave the parking location after loading and/or unloading.

In some example embodiments, to reach deployed position 5144 from stowed position 5146, frame 5110 may rotate approximately 90 degrees counter-clockwise as indicated by angle of rotation 5148. In deployed position 5144, frame 5110 may be at least partially beneath the trailer. The king pin may be generally over recess 5138 in upper rail 5116 and/or the underside of the trailer may be at least partially above upper surface 5136 of upper rail 5116.

In some example embodiments, in deployed position 5144, upper surface 5136 of upper rail 5116 may be substantially lower than the underside of the trailer. In particular, the underside of the trailer may be disposed substantially vertically spaced apart from upper surface 5136 of upper rail 5116. Accordingly, frame 5110 may be rotated between stowed position 5146 and deployed position 5144 without striking the trailer.

In some example embodiments, stabilizer 5100 may be operated between deployed position 5144 and an engaged position by actuation of jacks 5128, 5130. For example, starting in deployed position 5144, jacks 5128, 5130 may be extended, which may cause feet 5132, 5134 to press against surface 1002. Further extension of jacks 5128, 5130 may lift frame 5110 vertically upward, which may lift wheel 5124 off of surface 1002 and/or may cause collars 5112, 5114 to slide axially vertically upward on post 5102. Extension of jacks 5128, 5130, lifting frame 5110, may cause upper surface 5136 of upper rail to contact the underside of the trailer. Extension of jacks 5128, 5130 when upper rail 5116 is in contact with the trailer and feet 5132, 5134 are in contact with surface 1002 may cause stabilizer 5100 to securely engage the trailer and/or support at least some of the weight of the trailer. For example, the forward end of the trailer may be at least partially supported by stabilizer 5100 and/or the trailer's landing gear may be at least partially unloaded.

Figure 13:
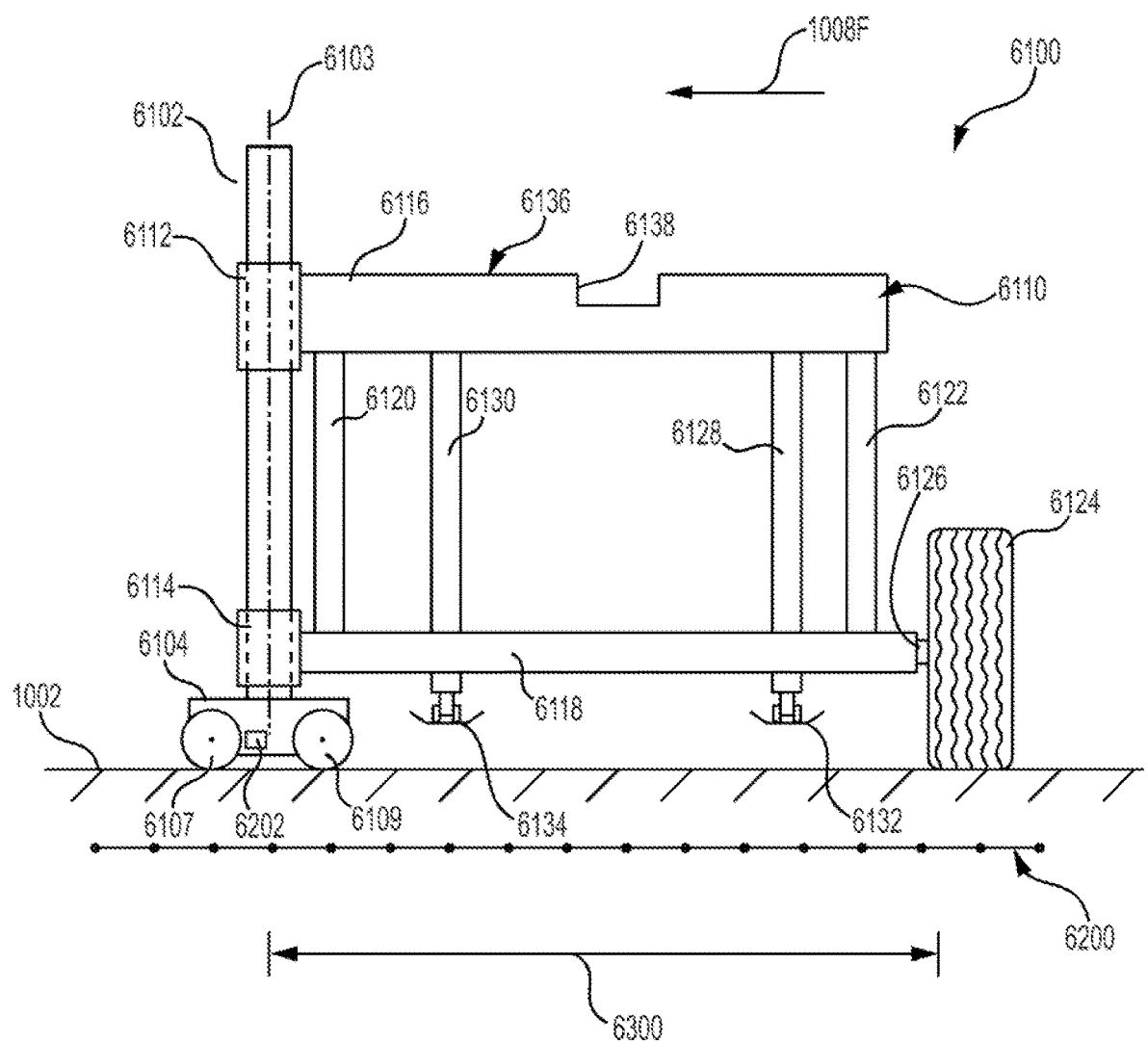
FIG. 13 is a left elevation view of an example stabilizer including a movable post.

FIG. 13 is a left elevation view of an example stabilizer 6100 including a movable post 6102, according to at least some aspects of the present disclosure. Generally, stabilizer 6100 may be similar in construction and/or operation to other example stabilizers described herein except for the differences noted. Unless explicitly excluded, various example features and methods associated with other example stabilizers described herein may be applicable to stabilizer 6100. In particular, stabilizer 6100 may be similar in construction and operation to stabilizer 5100 except that some example stabilizers 6100 may operate directly on surface 1002 (e.g., without tracks 5200, 5202).

In some example embodiments, stabilizer 6100 may be configured to accommodate trailers of different lengths by moving post 6102 generally forward and/or rearward with respect to the trailer. Stabilizer 6100 may be disposed on a surface 1002 on which trailer may be parked, such as near an opening (e.g., a loading dock door) in a building, such as a warehouse. Arrow 1008F indicates a forward direction with respect to the trailer. Generally, stabilizer 6100 may be configured for longitudinal movement with respect to the trailer, such as to accommodate trailers of different lengths. For example, standard trailer lengths may include about 48 feet and about 53 feet. Accordingly, stabilizer 6100 may be configured to move a longitudinal distance 6300 that at least allows stabilizer 5100 to properly engage 48 foot and 53-foot trailers. That is, post 6102 may be movable closer to and/or father away from the associated loading dock. Additionally, stabilizer 6100 may be configured to move between locations where stabilizer 6100 may be used, such as between various loading docks or trailer parking locations in the vicinity of a warehouse.

In some example embodiments according to at least some aspects of the present disclosure, stabilizer 6100 may include generally vertical post 6102, which may be movably disposed with respect to surface 1002. For example, post 6102 may be secured to a carriage 6104, which may be selectively movable relative to surface 1002. In some example embodiments carriage 6104 may include wheels 6107, 6019 which may be rollable on surface 1002. In some example embodiments, a carriage guide 6200 may be disposed in and/or on surface 1002. Carriage guide 6200 may include a guide wire, magnetic guide tape, and/or surface markings (e.g., colored lines) on surface 1002, for example. Carriage 6104 may include a sensor 6202 configured to detect carriage guide 6200 to facilitate movement of carriage 6104 along carriage guide 6200. Carriage guide 6200 may extend in a generally forward-rearward orientation with respect to the trailer, which may facilitate movement of post 6102 to accommodate trailers of different lengths. Post 6102 may be generally cylindrical (e.g., a right circular cylinder) and/or may have a generally vertical axis 6103.

In some example embodiments according to at least some aspects of the present disclosure, stabilizer 6100 may include a frame 6110 extending generally horizontally from post 6102. Frame 6110 may include one or more collars 6112, 6114, which may be rotatably (e.g., in a generally horizontal plane) and/or axially slidably (e.g., generally vertically) disposed on post 6102. In the example embodiment shown in FIG. 13, upper collar 6112 is positioned on post 6102 above lower collar 6114.

In some example embodiments according to at least some aspects of the present disclosure, frame 6110 may include an upper rail 6116 affixed to and/or extending generally horizontally radially from upper collar 6112. Similarly, a lower rail 6118 may be affixed to and/or extend generally horizontally radially away from lower collar 6114. One or more vertical frame members 6120, 6122 may extend generally vertically between upper rail 6116 and lower rail 6118. In some example embodiments, vertical frame members 6120, 6122 may keep upper rail 6116 and lower rail 6118 generally vertically aligned.

In some example embodiments according to at least some aspects of the present disclosure, upper rail 6116 may be configured to selectively engage an underside of the trailer. For example, upper rail 6116 may include an upper surface 6136 arranged to selectively at least partially support the underside of the forward portion of the trailer. For example, in an engaged position, upper surface 6136 of upper rail 6116 may press against the underside of the trailer. Upper rail 6116 may include a recess 6138, which may be arranged to receive a kingpin, which may extend generally downward from the underside of the trailer. In some example embodiments, recess 6138 may have a width and/or a depth greater than the corresponding dimensions of the kingpin so that the kingpin may be received within or may pass through recess 6138 even if the trailer is parked off center and/or misaligned with respect to a parking spot associated with the loading dock.

In some example embodiments according to at least some aspects of the present disclosure, stabilizer 6100 may include one or more jacks 6128, 6130, which may be configured to lift frame 6110 relative to surface 1002. In some example embodiments, jacks 6128, 6130 may be configured for powered operation. For example, one or more of jacks 6128, 6130 may include a hydraulic cylinder arranged to extend and retract so that feet 6132, 6134 may be selectively vertically pressed downward against surface 1002 and/or upper rail 6116 may be pressed upward against the underside of the trailer. Alternatively, one or more electric motors may be used to operate jacks 6128, 6130. In some example embodiments, jacks 6128, 6130 may be configured for hand-driven operation. For example, one or more of jacks 6128, 6130 may include a hand crank and/or a screw jack.

Jacks 6128, 6130 may be spaced-apart along frame 6110 so that, for example, jack 6128 is radially farther from post 6102 than jack 6130. In some example embodiments, the spaced-apart positioning of jacks 6128, 6130 may facilitate stabilizer 6100 serving as a stable support for the forward end of the trailer.

In some example embodiments according to at least some aspects of the present disclosure, stabilizer 6100 may include a support member, such as wheel 6124, to at least partially support frame 6110 above surface 1002 in at least some positions. Wheel 6124 may be disposed on an axle 6126 extending from the radially outward end of lower rail 6118, for example.

In some example embodiments, stabilizer 6100 may be rotatable about axis 6103 of post 6102 between a deployed position (e.g., extending at least partially under the trailer) and a stowed position (e.g., aligned generally parallel with trailer). For example, in some example embodiments configured for powered operation, a hydraulic cylinder may provide a motive force for rotating frame 6110 about axis 6103. Alternatively, a pneumatic cylinder and/or an electric motor may be used to rotate frame 6110 about axis 6103. In some example embodiments, frame 6110 may be manually rotated about axis 6103, such as between the deployed position and the stowed position. For example, frame 5110 may be substantially freely rotatable so that it may be pushed and/or pulled into the desired position by hand. In some example embodiments, stabilizer 6100 may include a hand-driven mechanism arranged to rotate frame 6110 (e.g., a crank and gearbox mechanism, hand crank and worm drive mechanism, hand crank and leadscrew mechanism, etc.).

In the stowed position, frame 6110 of stabilizer 6100 may be aligned generally parallel with a front-to-rear centerline of the trailer. In the stowed position, stabilizer 6100 may be substantially clear of the path that the trailer would travel to reach a parking location adjacent for loading and/or unloading. Similarly, in the stowed position, stabilizer 6100 may be substantially clear of the path that the trailer would travel to leave the parking location after loading and/or unloading.

In some example embodiments, to reach the deployed position from the stowed position, frame 6110 may rotate approximately 90 degrees counter-clockwise. In the deployed position, frame 6110 may be at least partially beneath the trailer. The king pin may be generally over recess 6138 in upper rail 6116 and/or the underside of the trailer may be at least partially above upper surface 6136 of upper rail 6116.

In some example embodiments, in the deployed position, upper surface 6136 of upper rail 6116 may be substantially lower than the underside of the trailer. In particular, the underside of the trailer may be disposed substantially vertically spaced apart from upper surface 6136 of upper rail 6116. Accordingly, frame 6110 may be rotated between the stowed position and the deployed position without striking the trailer.

In some example embodiments, stabilizer 6100 may be operated between the deployed position and an engaged position by actuation of jacks 6128, 6130. For example, starting in the deployed position, jacks 6128, 6130 may be extended, which may cause feet 6132, 6134 to press against surface 1002. Further extension of jacks 6128, 6130 may lift frame 6110 vertically upward, which may lift wheel 6124 off of surface 1002 and/or may cause collars 6112, 6114 to slide axially vertically upward on post 6102. Extension of jacks 6128, 6130, lifting frame 6110, may cause upper surface 6136 of upper rail to contact the underside of the trailer. Extension of jacks 6128, 6130 when upper rail 6116 is in contact with the trailer and feet 6132, 6134 are in contact with surface 1002 may cause stabilizer 6100 to securely engage the trailer and/or support at least some of the weight of the trailer. For example, the forward end of the trailer may be at least partially supported by stabilizer 6100 and/or the trailer's landing gear may be at least partially unloaded.

Figure 14:
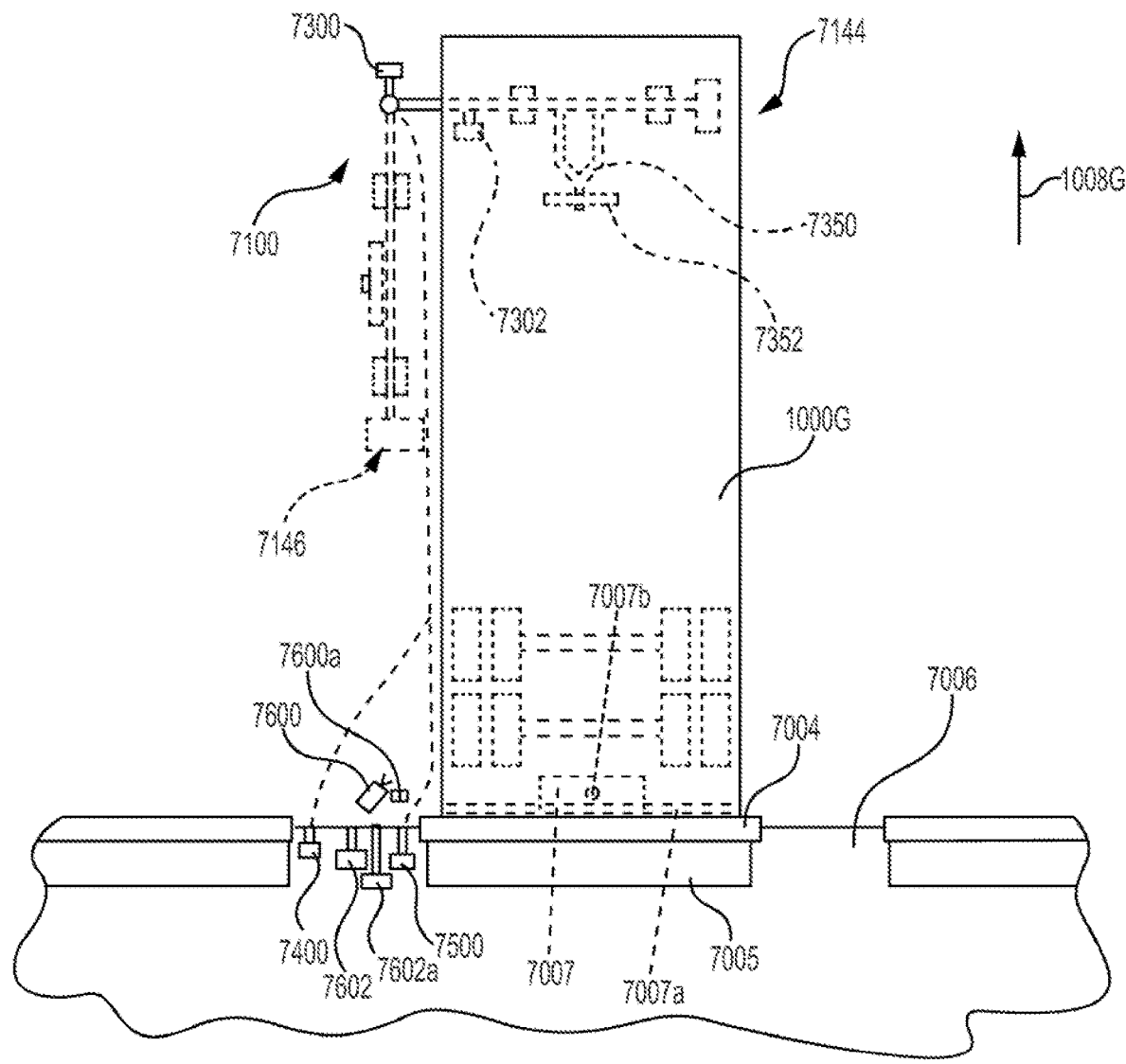
FIG. 14 is a plan view of an example stabilizer and a trailer at a loading dock door of a warehouse.

FIG. 14 is a plan view of an example stabilizer 7100 and a trailer 1000G at a loading dock door 7004 of a warehouse 7006, according to at least some aspects of the present disclosure. Generally, stabilizer 7100 may be similar in construction and/or operation to other example stabilizers described herein except for the differences noted. Unless explicitly excluded, various example features and methods associated with other example stabilizers described herein may be applicable to stabilizer 7100. For the avoidance of doubt, it is explicitly within the scope of the disclosure to utilize various example features described in connection with stabilizer 7100 (e.g., control, monitoring, interlocks, etc.) with any other example embodiments according to at least some aspects of the present disclosure.

Referring to FIG. 14, trailer 1000G may be parked adjacent to loading dock door 7004 for loading and/or unloading. Arrow 1008G indicates a forward direction with respect to trailer 1000G. Loading dock door 7004 may include an overhead door and/or a powered door opener. A dock leveler 7005 may be disposed adjacent loading dock door 7004 and may be utilized to adjust for height differences between trailer 1000G and the loading dock platform at loading dock door 7004. Dock leveler 7005 may be configured for powered operation. A trailer restraint 7007 may be provided at loading dock door 7004. Trailer restraint 7007 may be configured to releasably secure trailer 1000G, such as at a rear impact guard 7007a (i.e., an ICC bar), to prevent trailer 1000G from moving away from warehouse 7006 during loading and/or unloading. For example, trailer restraint 7007 may comprise a repositionable hook 7007b configured to selectively engage rear impact guard 7007a.

In some example embodiments, a stabilizer system may include one or more interlocks arranged to reduce the risk of unsafe and/or improper operation of the stabilizer system and/or other equipment. For example, a stabilizer system may include a control panel operatively connected to one or more of a stabilizer, loading dock door, camera(s), trailer restraint, and/or dock leveler. In some example embodiments, a door interlock may prevent opening loading dock door (e.g., an electrically operated overhead door) unless the stabilizer system is in an engaged position and/or the trailer restraint is engaged with the trailer. Similarly, a leveler interlock may prevent operation of a dock leveler unless the stabilizer system is in the engaged position. In some example embodiments, a stabilizer interlock may prevent moving stabilizer system from the engaged position unless loading dock door is shut, the trailer restraint is disengaged, and/or the dock leveler is retracted. Some example interlocks may be configured to interface with other loading dock systems to ensure that the various equipment associated with the loading dock is operated safely and appropriately.

Similar to other stabilizers disclosed herein, stabilizer 7100 may be rotatable between a stowed position 7146 and a deployed position 7144. In stowed position 7146, stabilizer may be aligned generally parallel with trailer 1000G and/or may be laterally out of the path that trailer 1000G may travel to and/or from loading dock door 7004. In deployed position 7144, stabilizer 7100 may extend generally laterally with respect to trailer 1000G so that stabilizer 7100 is at least partially beneath the forward end of trailer 1000G. Similar to other stabilizers disclosed herein, stabilizer 7100 may be operated from deployed position 7144 to an engaged position (e.g., engaged with trailer 1000G) by operation of one or more jacks disposed on stabilizer 7100. In some example embodiments, operating pivoting stabilizing 7100 to the engaged position may include engaging a king pin of trailer 1000G and/or engaging a connector 7350 extending from stabilizer 7100 with an anchor 7352, in a manner generally similar to that described above with respect to FIGS. 6-9.

In some example embodiments, stabilizer 7100 may include an exterior indicator 7300, which may be arranged to indicate a status of stabilizer 7100 to personnel or equipment outside of warehouse 7006. In some example embodiments, exterior indicator 7300 may include a light arranged to indicate a status of stabilizer to a yard truck operator who may be assigned to park trailer 1000G at loading dock door 7004 and/or move trailer 1000G away from loading dock door 7004. For example, exterior indicator 7300 may display a green light when stabilizer 7100 is in stowed position 7146 and/or may display a red light when stabilizer 7100 is not in stowed position 7146 (e.g., in any condition other than fully stowed). Accordingly, a yard truck operator may attempt to move trailer 1000G only when exterior indicator 7300 shows a green light, indicating that stabilizer 7100 is fully stowed and will not obstruct movement of trailer 1000G. In some example embodiments, exterior indicator 7300 may include a non-electric indication, such as a flag that is selectively exposed or changes position based on the status of stabilizer 7100.

In some example embodiments, stabilizer 7100 may include an interior indicator 7400, which may be arranged to indicate a status of stabilizer 7100 to personnel or equipment inside of warehouse 7006. In some example embodiments, interior indicator 7400 may include a light arranged to indicate a status of stabilizer to a lift truck operator who may be assigned to load and/or unload trailer 1000G via loading dock door 7004. For example, interior indicator 7400 may display a green light when stabilizer 7100 is in the engaged position and/or may display a red light when stabilizer 7100 is not in the engaged position (e.g., in any condition other than fully engaged). Accordingly, a lift truck operator may attempt to load and/or unload trailer 1000G only when interior indicator 7400 shows a green light, indicating that stabilizer 7100 is fully engaged with trailer 1000G. In some example embodiments, interior indicator 7400 may include a non-electric indication, such as a flag that is selectively exposed or changes position based on the status of stabilizer 7100.

In some example embodiments, stabilizer 7100 may include one or more interlocks arranged to reduce the risk of unsafe or improper operation of stabilizer 7100 and/or equipment associated with loading dock 7004. For example, stabilizer 7100 may be operatively connected to a control panel 7500 configured to control stabilizer 7100, loading dock door 7004, and/or dock leveler 7005. In some example embodiments, a door interlock may prevent opening loading dock door 7004 unless stabilizer 7100 is in the engaged position. Similarly, a leveler interlock may prevent operation of dock leveler 7005 unless stabilizer 7100 is in the engaged position. In some example embodiments, a stabilizer interlock may prevent operating stabilizer 7100 from the engaged position unless loading dock door 7004 is shut and/or dock leveler 7005 is retracted. Some example interlocks may be configured to interface with other loading dock systems, such as dock-mounted trailer restraints, to ensure that the various equipment associated with the loading dock is operated safely and appropriately.

Some example embodiments may include one or more cameras 7600 and/or displays 7602 arranged to allow personnel remote from stabilizer 7100 (e.g., personnel inside warehouse 7006) to view the vicinity of stabilizer 7100, such as to ascertain the status of stabilizer 7100. In some example embodiments, camera 7600 may allow visual observation of the position and status stabilizer 7100 and/or camera 7600 may allow visual observation of an exterior indicator (e.g., exterior indicator 7300). For example, prior to opening loading dock door 7004, personnel inside warehouse 7006 may use camera 7600 and/or display 7602 to visually verify that that stabilizer 7100 is engaged with trailer 1000G. In some example embodiments, the camera 7600 and display 7602 may be configured to also allow visual observation of the trailer restraint 7007, such as to allow confirmation that the trailer restraint 7007 has properly engaged the trailer 1000G. Alternatively, some example embodiments may include one or more cameras 7600a and/or displays 7602a (e.g., instead of or in addition to camera 7600 and/or display 7602) arranged to allow personnel remote from trailer restraint 7007 to view the trailer restraint 7007.

Some example embodiments may include an additional exterior indicator 7302, which may be observable via a window in warehouse 7006 and/or camera 7600 and display 7602, which may be configured to display a different status than exterior indicator 7300. For example, exterior indicator 7302 may indicate whether or not stabilizer 7100 is in the engaged position, similar to interior indicator 7400. In some example embodiments, exterior indicator 7300 may be arranged for viewing by a yard truck operator and/or may be generally not viewable by personnel inside warehouse 7006 to reduce the likelihood of confusion. Exterior indicator 7302 may be arranged for viewing by personnel inside warehouse 7006 (such as via a window and/or camera 7600 and display 7602) and/or may be generally not viewable by personnel outside of warehouse 7006 (such as yard truck operators) to reduce the likelihood of confusion.

In some example embodiments, control panel 7500 may control powered operations (e.g., electrically, pneumatically, and/or hydraulically powered operations) of stabilizer 7100 so that an operator may direct various operations of stabilizer 7100 using control panel 7500. For example, before accessing trailer 1000G, an operator may use control panel 7500 to move stabilizer 7100 from the stowed position to the deployed position and/or from the deployed position to the engaged position. Once stabilizer 7100 is engaged with trailer 1000G, the operator may open loading dock door 7004 and position dock leveler 7005 to allow lift trucks to load and/or unload trailer 1000G. After loading and/or unloading is complete, the operator may retract dock leveler 7005 and/or shut loading dock door 7004. Then, the operator may use control panel 7500 to disengage stabilizer 7100 from trailer 1000G and/or return stabilizer 7100 to the stowed position. In some example embodiments, the operator may utilize camera 7600 and/or 7602 to verify that trailer 1000G is present at the loading dock and/or that personnel and objects are clear of the path of stabilizer 7100 before operating stabilizer 7100 using control panel 7500.

Figure 15:
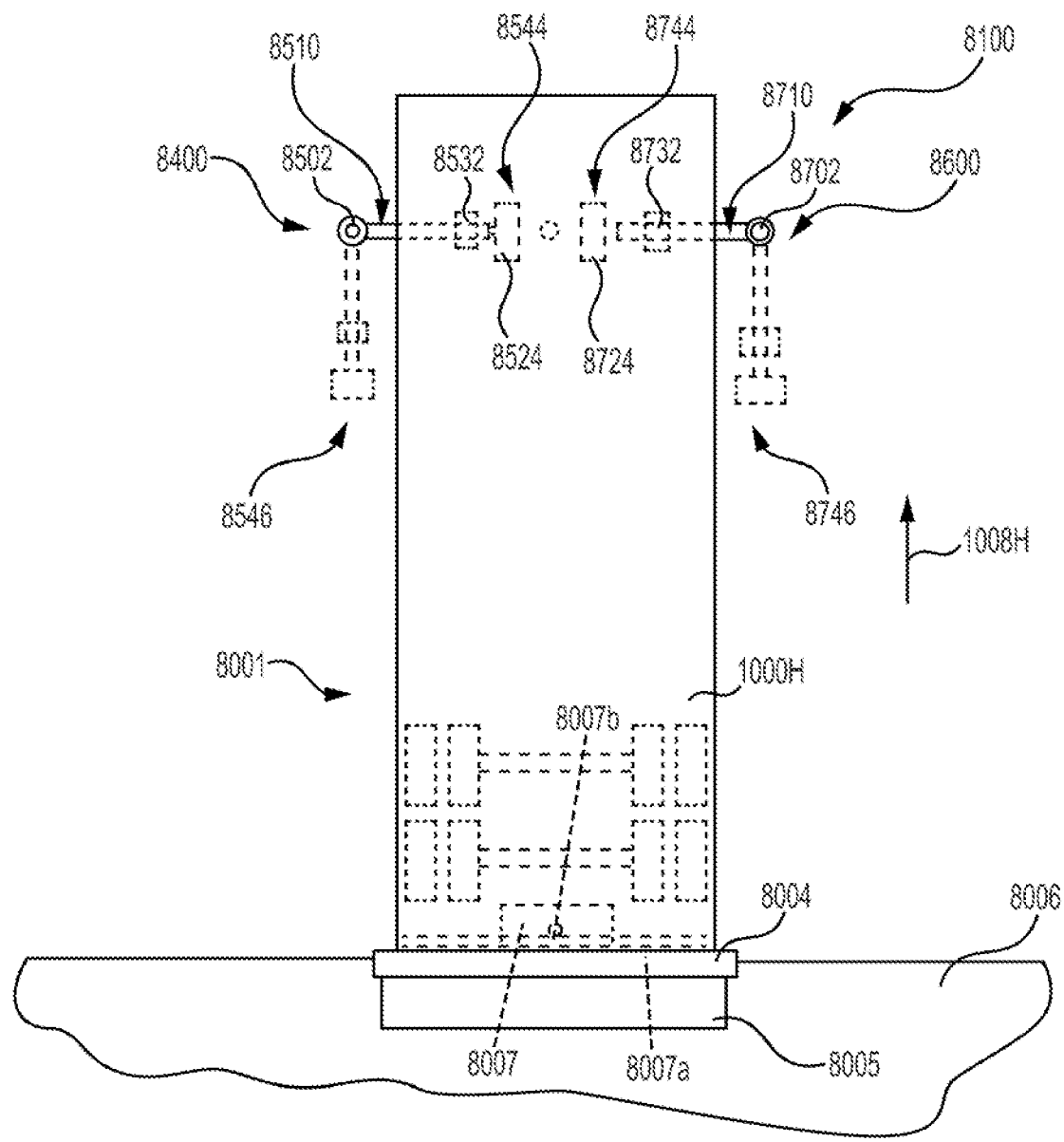
FIG. 15 is a plan view of an example stabilizer system including opposed stabilizers.
Figure 16:
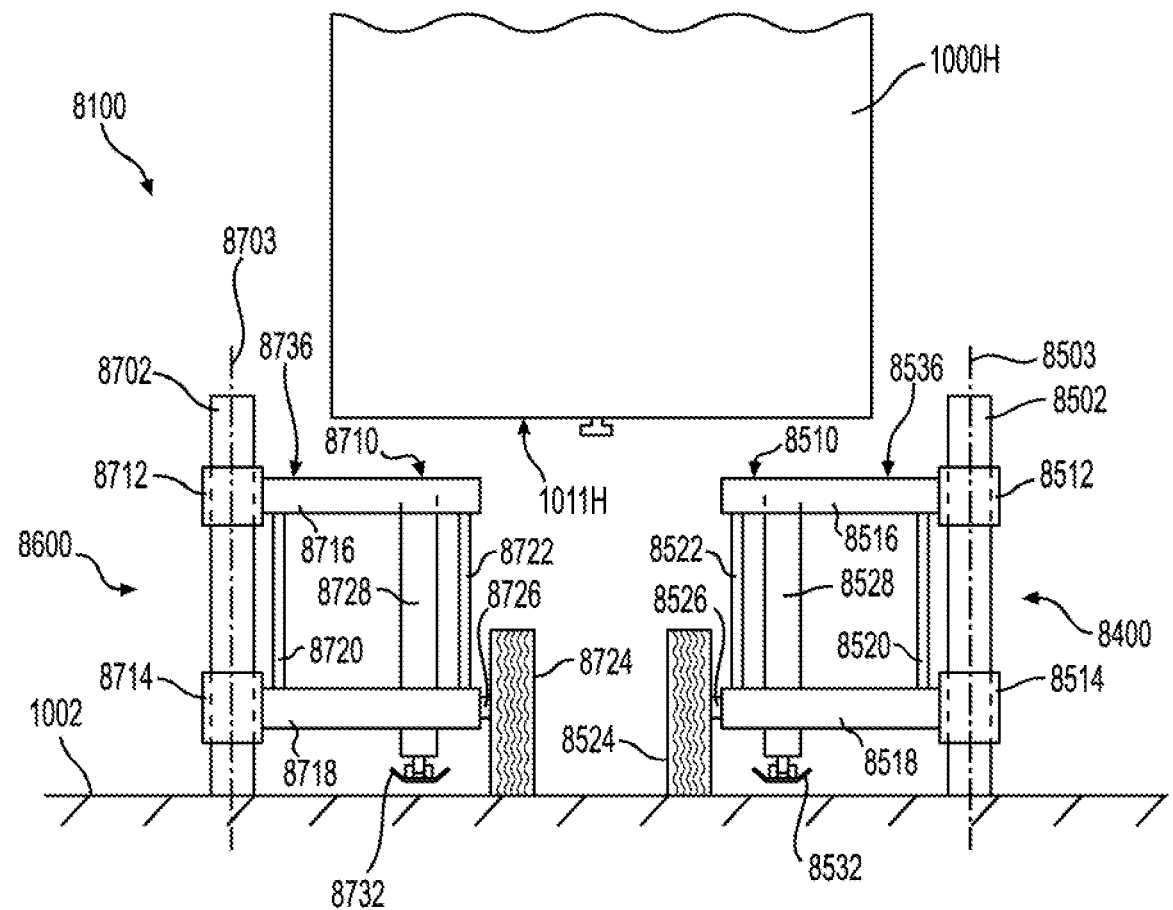
FIG. 16 is a front elevation view of an example stabilizer system in a deployed position.
Figure 17:
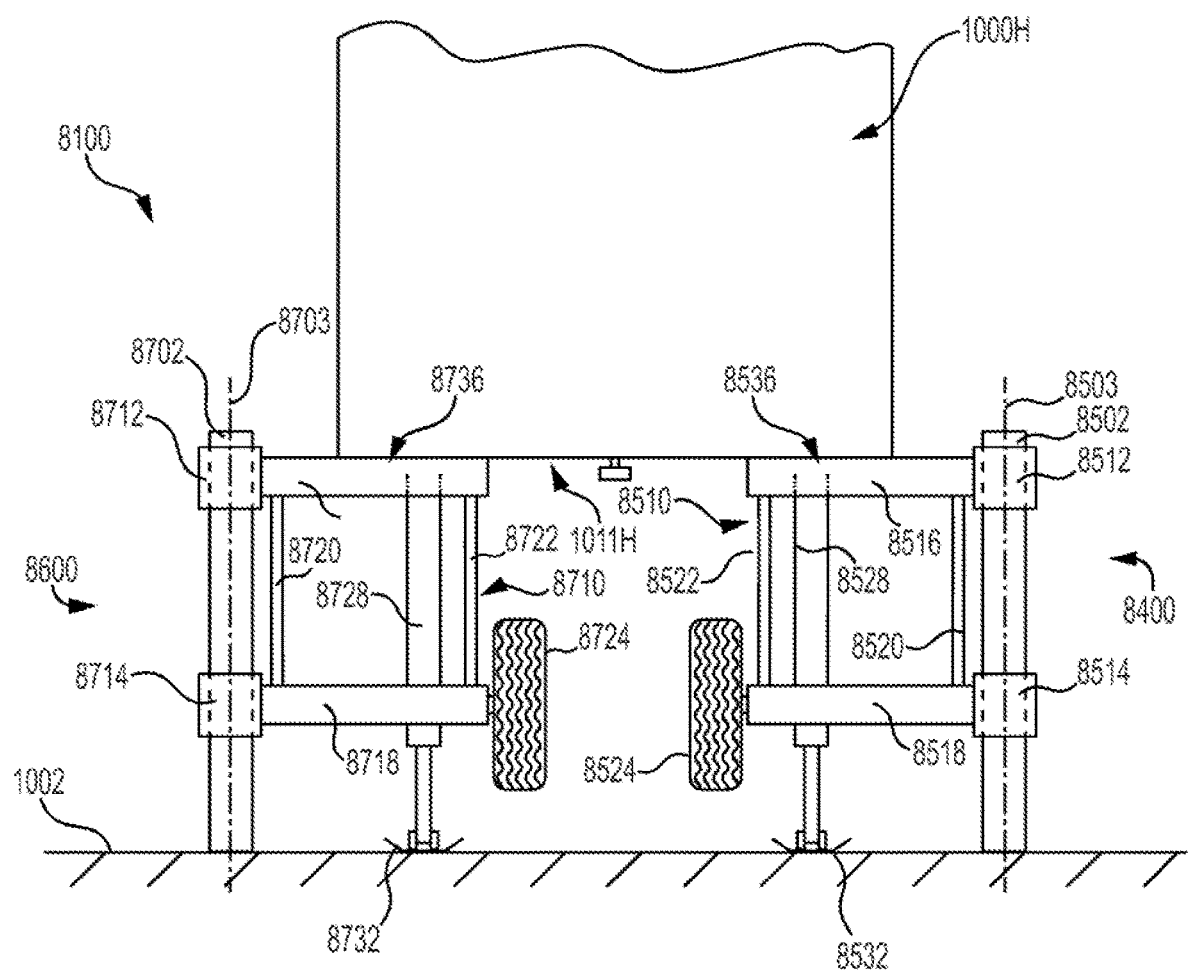
FIG. 17 is a front elevation view of an example stabilizer system in an engaged position.

FIG. 15 is a plan view of an example stabilizer system 8100 including opposed stabilizers 8400, 8600, FIG. 16 is a front elevation view of stabilizer system 8100 in a deployed position, and FIG. 17 is a front elevation view of stabilizer system 8100 in an engaged position, all according to at least some aspects of the present disclosure. Generally, stabilizer system 8100 may be similar in construction and/or operation to other example stabilizers described herein except for the differences noted. Unless explicitly excluded, various example features and methods associated with other example stabilizers described herein may be applicable to stabilizer system 8100.

Referring to FIGS. 15-17, stabilizer system 8100 may include opposed stabilizers 8400, 8600, which may be disposed on surface 1002 on laterally opposite sides of location 8001 in which a trailer 1000H may be parked, such as near a loading dock door/opening 8004 in a warehouse 8006. Arrow 1008H indicates a forward direction with respect to trailer 1000H. Trailer 1000H may be parked with its rear opening (not shown) generally aligned with loading dock door/opening 8004 so that the contents of trailer 1000H (e.g., cargo) may be loaded from and/or unloaded into warehouse 8006. Warehouse 8006 may be equipped with a dock leveler 8005 associated with loading dock door 8004. A trailer restraint 8007 may be provided at loading dock door 8004. Trailer restraint 8007 may be configured to releasably engage trailer 1000H, such as at a rear impact guard 8007a, to prevent trailer 1000H from moving away from warehouse 8006 during loading and/or unloading. For example, trailer restraint 8007 may comprise a repositionable hook 8007b configured to selectively engage rear impact guard 8007a. Trailer 1000H may include landing gear, which may be configured to at least partially support the forward end of trailer 1000, such as when trailer is not coupled to a tractor. It will be appreciated that two opposite-facing stabilizers (e.g., a stabilizer 8400 and a stabilizer 8600) may be positioned in tandem between adjacent parking locations, one forward of the other, to service the adjacent parking locations. The forward of the two stabilizers 8400, 8600 may be configured to service one of the parking locations and/or the rearward of the two stabilizers may be configured to service the other of the two parking locations. In another alternative example configuration, a single post between two parking locations may be configured for use in two opposite-facing stabilizers 8400, 8600 between two adjacent parking locations.

In some example embodiments according to at least some aspects of the present disclosure, a stabilizer 8400, 8600 may include a post 8502, 8702, which may be generally vertical and/or which may be rigidly mounted with respect to surface 1002. For example, posts 8502, 8702 may be secured to some types of surfaces (e.g., concrete) by fasteners, such as one or more bolts and into surface 1002. Alternatively or additionally, posts 8502, 8702 may include a buried portion extending into and/or below surface 1002, which may be utilized in connection with surfaces such as asphalt, for example. Posts 8502, 8702 may be generally cylindrical (e.g., a right circular cylinder) and/or may have generally vertical axes 8503, 8703.

In some example embodiments according to at least some aspects of the present disclosure, a stabilizer 8400, 8600 may include a frame 8510, 8710 repositionably coupled to its respective post 8502, 8702. For example, frames 8510, 8710 may extend generally horizontally from their respective posts 8502, 8702. Frames 8510, 8710 may include one or more couplings, such as collars 8512, 8514, 8712, 8714, which may be vertically repositionable with respect to posts 8502, 8702. For example, collars 8512, 8514, 8712, 8714 may be rotatably (e.g., in a generally horizontal plane) and/or axially slidably (e.g., generally vertically) disposed on respective posts 8502, 8702. In the example embodiment shown in FIGS. 15-17, upper collars 8512, 8712 are positioned on posts 8502, 8702 above lower collars 8514, 8714, respectively.

In some example embodiments according to at least some aspects of the present disclosure, frames 8510, 8710 may include upper rails 8516, 8716 affixed to and/or extending generally horizontally radially from respective upper collars 8512, 8712. Similarly, respective lower rails 8518, 8718 may be affixed to and/or extend generally horizontally radially from lower collars 8514, 8714. One or more vertical frame members 8520, 8522, 8720, 8722 may extend generally vertically between respective upper rails 8516, 8716 and lower rails 8518, 8718. In some example embodiments, vertical frame members 8520, 8522, 8720, 8722 may keep respective upper rails 8516, 8716 and lower rails 8518, 8718 generally vertically aligned.

In some example embodiments according to at least some aspects of the present disclosure, upper rails 8516, 8716 may be configured to selectively engage an underside 1011H of trailer 1000H. For example, upper rails 8516, 8716 may include respective upper surfaces 8536, 8736 arranged to selectively at least partially support underside 1011H of the forward portion of trailer 1000H. For example, in the engaged position (FIG. 17), upper surfaces 8536, 8736 of upper rails 8516, 8716 may press against underside 1011H of trailer 1000H.

In some example embodiments according to at least some aspects of the present disclosure, respective stabilizers 8400, 8600 may include one or more jacks 8528, 8728, which may be configured to wedge jacks 8528, 8728 and/or frames 8510, 8710 between underside 1011H of trailer 1000H and surface 1002. For example, jacks 8528, 8728 may be configured to lift respective frames 8510, 8710 relative to surface 1002. In some example embodiments, jacks 8528, 8728 may be configured for powered operation. For example, one or more of jacks 8528, 8728 may include a hydraulic or pneumatic cylinder arranged to extend and retract so that feet 8532, 8732 may be selectively vertically pressed downward against surface 1002 and/or upper rails 8516, 8716 may be pressed upward against underside 1011H of trailer 1000H. Alternatively, one or more electric motors may be used to operate jacks 8528, 8728 (or other jacks disclosed herein). In some example embodiments, jacks 8528, 8728 may be configured for hand-driven operation. For example, one or more of jacks 8528, 8728 may include a hand crank and/or a screw jack.

In some example embodiments, jacks 8528, 8728 may be spaced-apart laterally with respect to trailer 1000H. In some example embodiments, the laterally spaced-apart positioning of jacks 8528, 8728 may facilitate stabilizer system 8100 (including stabilizers 8400, 8600) serving as a stable support for the forward end of trailer 1000H.

In some example embodiments according to at least some aspects of the present disclosure, stabilizers 8400, 8600 may include respective support members, such as wheels 8524, 8724, to at least partially support respective frames 8510, 8710 above surface 1002 in at least some positions. Wheels 8524, 8724 may be disposed on respective axles 8526, 8726 extending from the radially outward ends of lower rails 8518, 8718, for example. In some example embodiments, support members other than wheels 8524, 8724 may be utilized. For example, a caster and/or a series of ball transfers (e.g., "Hudson bearings") may be substituted for wheels 8524, 8724 (or other wheels disclosed herein).

Some example embodiments may include a guide rails, such as a tubular rail, which may be positioned generally forward of posts 8502, 8702 generally similar to guide rail 1014 (FIG. 2). Some example guide rails may prevent or reduce damage caused by a misaligned trailer backing into stabilizer system 8100.

Referring to FIG. 15, in some example embodiments, stabilizers 8400, 8600 may be rotatable about axes 8503, 8703 of respective posts 8502, 8702 between a deployed position 8544, 8744 and respective stowed positions 8546, 8746 (shown with dashed lines). For example, in some example embodiments configured for powered operation, a hydraulic cylinder may provide a motive force for rotating frames 8510, 8710 about axes 8503, 8703. Alternatively, pneumatic cylinders and/or electric motors may be used. In some example embodiments, frames 8510, 8710 may be manually rotated, such as between deployed positions 8544, 8744 and stowed positions 8546, 8746. For example, frames 8510, 8710 may be substantially freely rotatable so that they may be pushed and/or pulled into the desired position by hand. Some example embodiments may include hand-driven mechanisms arranged to rotate frames 8510, 8710 (e.g., a crank and gearbox mechanism, hand crank and worm drive mechanism, hand crank and leadscrew mechanism, etc.).

In stowed positions 8546, 8746, frames 8510, 8710 may be aligned generally parallel with a front-to-rear centerline of trailer 1000H. In stowed positions 8546, 8746, stabilizers 8400, 8600 may be substantially clear of the path that trailer 1000H would travel to reach parking location 8001 adjacent loading dock door 8004 of warehouse 8006 for loading and/or unloading. Similarly, in stowed positions 8546, 8746, stabilizers 8400, 8600 may be substantially clear of the path that trailer 1000H would travel to leave parking location 8001 after loading and/or unloading.

In some example embodiments, to reach deployed positions 8544, 8744 from stowed positions 8546, 8746, frames 8510, 8710 may rotate approximately 90 degrees counterclockwise or clockwise, respectively. In deployed positions 8544, 8744, frames 8510, 8710 may be at least partially beneath trailer 1000H.

As shown in FIG. 16, in some example embodiments, in deployed positions 8544, 8744, upper surfaces 8536, 8736 of upper rails 8516, 8716 may be substantially lower than underside 1011H of trailer 1000H. In particular, underside 1011H of trailer may be disposed substantially vertically spaced apart from upper surfaces 8536, 8736 of upper rails 8516, 8716. Accordingly, frames 8510, 8710 may be rotated between stowed positions 8546, 8746 and deployed positions 8544, 8744 without striking trailer 1000H.

Referring to FIGS. 16 and 17, in some example embodiments, stabilizer system 8100 may be operated between the deployed position (FIG. 16) and an engaged position (FIG. 17) by actuation of jacks 8528, 8728. For example, starting in the deployed position (FIG. 16), jacks 8528, 8728 may be extended, which may cause feet 8532, 8732 to press against surface 1002. Further extension of jacks 8528, 8728 may lift frames 8510, 8710 vertically upward, which may lift wheels 8524, 8724 off of surface 1002 and/or may cause collars 8512, 8514, 8712, 8714 to slide axially vertically upward on respective posts 8502, 8702. Extension of jacks 8528, 8728, lifting frames 8510, 8710, may cause upper surfaces 8536, 8736 of upper rails 8516, 8716 to contact underside 1011H of trailer 1000H. Extension of jacks 8528, 8728 when upper rails 8516, 8716 are in contact with trailer 1000H and feet 8532, 8732 are in contact with surface 1002 may cause stabilizer system 8100 to securely engage trailer 1000H and/or support at least some of the weight of trailer 1000H. For example, the forward end of trailer 1000H may be at least partially supported by stabilizer system 8100 and/or the landing gear of trailer 1000H may be at least partially unloaded.

Some example embodiments as shown in FIGS. 15-17 may be operated as follows. Trailer 1000H may be maneuvered into position and parked on surface 1002 in a location associated with loading dock door 8004 in warehouse 8006, such as by a yard truck coupled to a king pin of trailer 1000H. The yard truck may disconnect from trailer 1000H. Frames 8510, 8710 may be repositioned (e.g., pivoted) from the stowed positions to the deployed positions. Jacks 8528, 8728 may be extended to engage the trailer 1000H with the frames 8510, 8710 and/or the jacks 8528, 8728, forming a wedge between the lower surface 1011H of the trailer 1000H and the surface 1002. For example, jacks 8528, 8728 may be extended to lift frames 8510, 8710 above surface 1002. Frames 8510, 8710 may reach the engaged position when upper surfaces 8536, 8736 of upper rails 8516, 8716 are in contact with lower surface 1011H of trailer 1000H. After loading and/or unloading of trailer 1000H is complete, frames 8510, 8710 may be disengaged from trailer by retracting jacks 8528, 8728. Then, frames 8510, 8710 may be pivoted from the deployed position to the stowed position. With frames 8510, 8710 in the stowed position, trailer 1000H may be coupled to a tractor or yard truck and moved to another location.

Figure 18:
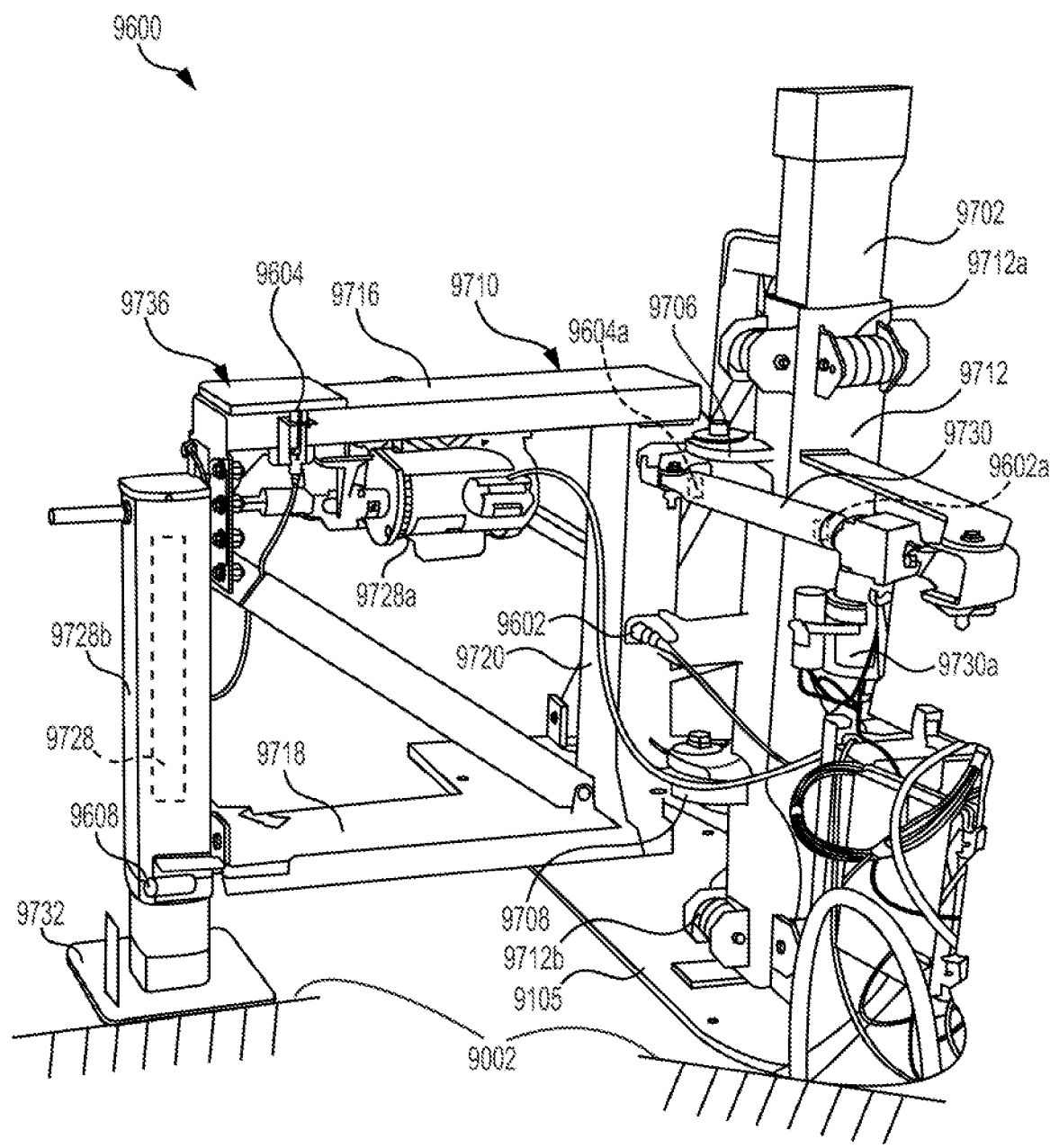
FIG. 18 is a perspective view of an alternative example stabilizer in an engaged position.
Figure 19:
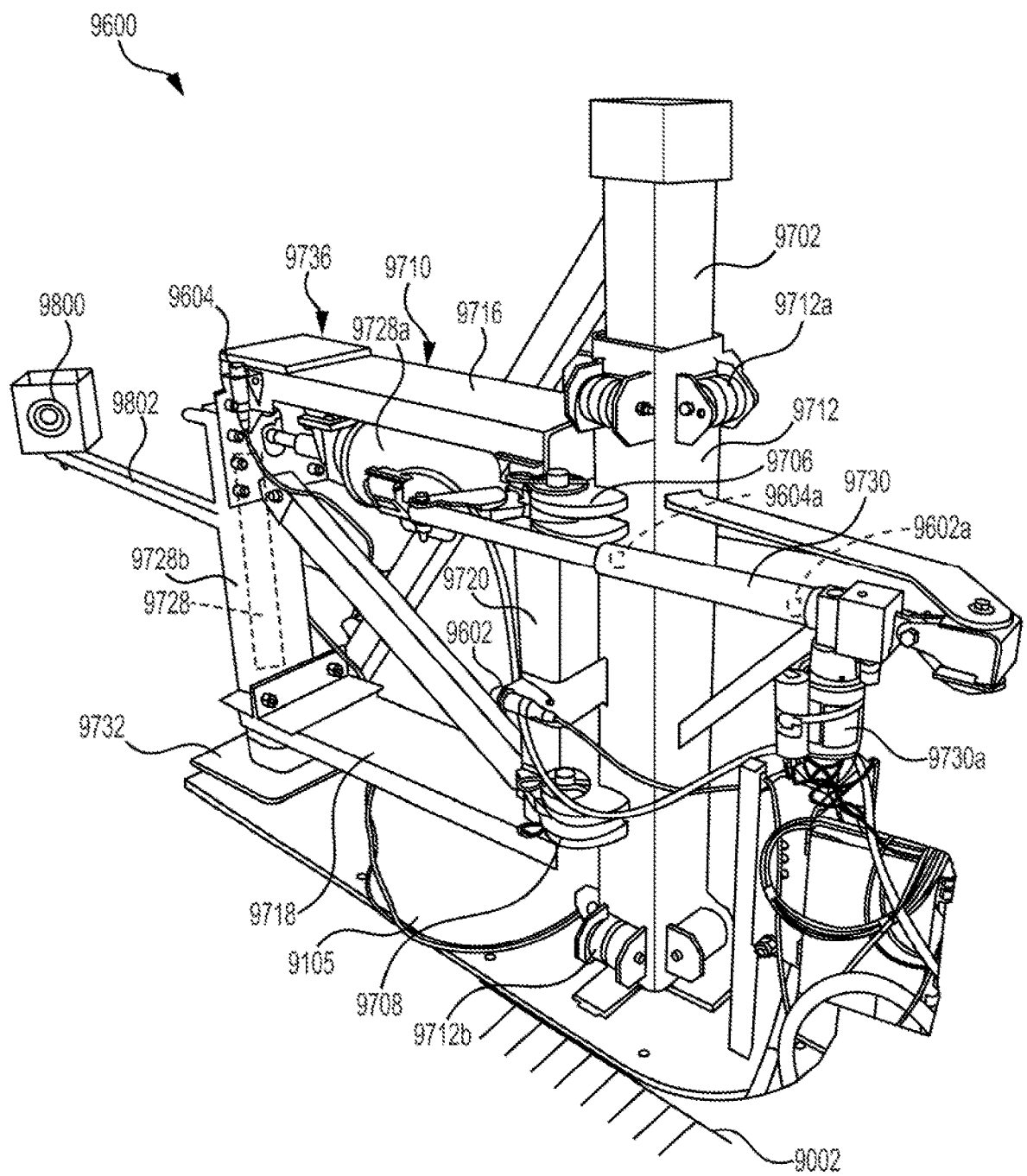
FIG. 19 is a perspective view of an alternative example stabilizer in a stowed position; all in accordance with at least some aspects of the present disclosure.

FIG. 18 is a perspective view of an alternative example stabilizer 9600 in an engaged position and FIG. 19 is a perspective view of stabilizer 9600 in a stowed position, all according to at least some aspects of the present disclosure. Referring to FIGS. 18 and 19, stabilizer 9600 is generally similar in construction and operation to stabilizers 8400, 8600 and may be utilized in a stabilizer system including opposed stabilizers similar to stabilizer system 8100 described above with reference to FIGS. 15-17. In such a stabilizer system, stabilizer 9600 may be paired with a substantially similar, mirror-image stabilizer. For brevity, stabilizer 9600 is described in detail below with the understanding that a second, substantially similar, mirror-image stabilizer may be included in some example stabilizer systems. Unless explicitly excluded, various example features and methods associated with other example stabilizers described herein may be applicable to stabilizer systems including stabilizer 9600, and redundant description is omitted.

Generally, stabilizer 9600 may be disposed on a surface 9002 on a lateral side of a location in which a trailer may be parked, such as near a loading dock door in a warehouse, similar to stabilizer system 8100. Stabilizer 9600 may include a post 9702, which may be generally vertical and/or which may be rigidly mounted with respect to surface 9002, such as by a flange 9105 which is bolted to surface 9002. In this example embodiment, post 9702 comprises a generally square steel tube.

Stabilizer 9600 may include a frame 9710, which may be repositionably coupled to post 9702 and/or may extend generally horizontally from post 9702. Frame 9710 may include one or more couplings, such as collars 9712, which may be vertically repositionable with respect to pot 9702. For example, collar 9712 may be axially slidably (e.g., generally vertically) disposed on post 9702. In this example embodiment, collar 9712 comprises a generally square steel tube sized to fit over post 9702. Collar 9712 may include one or more rollers 9712a, 9712b mounted thereon to support collar 9712 on post 9702. For example, rollers 9712a, 9712b may extend through corresponding openings in collar 9712 to contact post 9702 so that collar 9712 is vertically slidable with minimal direct contact and/or friction against post 9702. As shown in FIGS. 18 and 19, additional rollers 9712a, 9712b may be provided on various faces, such as each face, of a polygonal post, for example. Rollers 9712a, 9712b may be provided generally near the top of collar 9712 and/or generally near the bottom of collar 9712, for example.

Frame 9710 may include an upper rail 9716 and/or a lower rail 9718 affixed to and/or extending generally horizontally from collar 9712. In the example embodiment illustrated in FIG. 18, both the upper rail 9716 and the lower rail 9718 extend from a single collar 9712; however, it will be appreciated that other example embodiments may include separate collars for the upper rail 9716 and lower rail 9718, such as illustrated in FIGS. 16 and 17. One or more vertical frame members 9720 may keep upper rail 9716 and lower rail 9718 generally vertically aligned. Upper rail 9716 may be configured to selectively engage an underside of a trailer. For example, upper rail 9716 may include an upper surface 9736 arranged to selectively at least partially support the underside of the forward portion of a trailer.

Stabilizer 9600 may include a jack 9728, which may be coupled to frame 9710 and/or which may be configured to lift frame 9710 relative to surface 9002, such as from a deployed position to an engaged position. For example, jack 9728 may comprise a screw jack, which may be configured for powered operation by an electric motor 9728a. Jack 9728 may be configured to extend and retract so that jack 9728 and/or frame 9710 may be wedged between the underside of the trailer and surface 9002. For example, jack 9728 may be configured to extend and retract so that a foot 9732 may be selectively vertically pressed downward against surface 9002 and/or upper rail 9716 may be pressed upward against the underside of the trailer. In the example embodiment illustrated in FIG. 18, the housing 9728b of jack 9728 may act as a vertical frame member maintaining the alignment of upper rail 9716 and/or lower rail 9718. In this example embodiment, stabilizer 9600 does not include a support member (e.g., wheel) on frame 9710; instead, frame 9710 is substantially cantilevered from post 9702 when foot 9732 is not on surface 9002.

In the example embodiment illustrated in FIGS. 18 and 19, frame 9710 is rotatable with respect to post 9702 about hinges 9706, 9708 operatively connecting frame 9710 to collar 9712. A linear actuator 9730, which may be driven by an electric motor 9730*a*, may be configured to act between post 9702 and frame 9710 to pivot frame 9710 between a deployed position and a stowed position similar to stabilizer system 8100.

In the example embodiment of FIGS. 18 and 19, frame 9710 is configured to pivot about 90 degrees between the stowed and deployed positions. Some exemplary embodiments may be configured to operate in a plurality of deployed positions. For example, frame 9710 may be configured to pivot about 90 degrees from the stowed position (e.g., generally parallel to the trailer) to a first deployed position (e.g., generally laterally across beneath the trailer) for a 53-foot trailer. Frame 9710 may also be configured to pivot about 45 degrees from the stowed position to a second deployed position for a 48-foot trailer. Accordingly, some stabilizers 9600 may be configured to accommodate trailers of different lengths.

Stabilizer 9600 may include one or more sensors configured to detect various parameters associated with operation of the stabilizer 9600. For example, stabilizer 9600 may include a deployed position sensor 9602 configured to detect when frame 9710 is in the deployed position. Stabilizer 9600 may include an engaged position sensor 9604 configured to detect when the frame 9710 is in contact with the underside of the trailer. Stabilizer 9600 may include a stowed position sensor (e.g., generally similar to deployed position sensor 9602) that is configured to detect when the frame 9710 is in the stowed position. In some example embodiments, an actuator, such as linear actuator 9730 may include on-board sensors, such as limit switches 9602*a*, 9604*a*, for detecting the extension or retraction of linear actuator 9730, which may be used to detect when frame 9710 is in the deployed or stowed based on the extension of linear actuator 9730. Stabilizer 9600 may include a foot retraction sensor 9608 configured to detect when the jack 9728 has retracted the foot 9732 above the surface 9002. Various types of sensors may be utilized on various example embodiments, such as limit switches, proximity sensors, photo eyes, etc.

Sensors may be used to control various aspects of operations of stabilizer 9600. For example, the deployed position sensor 9602 and/or limit switch 9602*a* may be utilized to determine when operation of the linear actuator 9730 should stop when pivoting from the stowed configuration to the deployed configuration. The deployed position sensor 9602 and/or limit switch 9602*a* may be utilized to determine when to commence operation of jack 9728 to the engaged position. The engaged position sensor 9604 may be utilized to determine when to stop operation of the jack 9728 in the engaged position. The foot retraction sensor 9608 may be utilized to determine when to commence operation of the linear actuator 9730 from the deployed configuration to the stowed configuration. The stowed position sensor and/or limit switch 9604*a* may be utilized to determine when to stop operation of the linear actuator 9730 when pivoting from the deployed configuration to the stowed configuration. In some embodiments, some sensors may be used for control of various components and other sensors may be used for indication and/or verification, such as at a control panel and/or controller. For example, limit switches 9602*a*, 9604*a* may be used to control the operation of linear actuator 9730 while deployed position sensor 9602 and the stowed position sensor may be used for indication and/or position verification.

Some example embodiments may include one or more cameras operatively connected to one or more remote displays, similar to cameras 7600, 7602 and displays 7602, 7602*a* described above. For example, a camera 9800 mounted on an arm 9802 may be arranged to view the underside of the trailer in the vicinity of the stabilizer 9600. The camera 9800 may be utilized, for example, to visually confirm that the area is clear prior to remotely operating the stabilizer 9600 and/or to visually confirm status and/or operation of the stabilizer 9600 (e.g., stowing, deploying, engaging, etc.).

Example methods of using a stabilizer system including stabilizer 9600 according to at least some aspects of the present disclosure are described below and may include optional and/or alternative structures and/or operations. Some example embodiments as shown in FIGS. 18 and 19 may be operated as follows before a trailer is loaded and/or unloaded. A trailer may be maneuvered into position and parked on surface 9002 in a location associated with a loading dock door in a building, such as a warehouse. A sensor may detect that the trailer is present and/or a light may illuminate or another indicator may be provided indicating that the trailer is present (e.g., inside the warehouse on a control box). A trailer restraint may be engaged, such as automatically after the trailer's presence is detected or manually by an operator. A light may illuminate or another indicator may be provided indicating that the trailer restraint has successfully engaged the trailer or has failed to engage the trailer. The trailer restraint indication may be provided inside and/or outside the warehouse. The stabilizer system (e.g., including stabilizer 9600) may be deployed and engaged, such as automatically after the trailer restraint has successfully engaged the trailer or manually by an operator. A light may illuminate or another indicator may be provided indicating that the stabilizer system has successfully deployed and engaged, for example when both the deployed position sensor 9602 and the engaged position sensor 9604 indicate detection of their respective conditions. The stabilizer system indication may be provided inside and/or outside the warehouse. Successful deployment of the stabilizer system may satisfy an interlock allowing operation of the loading dock door. For example, the loading dock door may be automatically opened upon successful deployment of the stabilizer system, or the door may be manually opened by an operator. A light may illuminate or another indicator may be provided indicating that the loading dock door is fully open. Fully opening the loading dock door may satisfy an interlock allowing operation of a dock lever. For example, the dock leveler may be automatically activated upon fully opening the loading dock door, or the dock leveler may be manually activated by an operator. A light may illuminate or another indicator may be provided indicating that the dock leveler is in use. At this point, the trailer may be loaded and/or unloaded.

Similarly, some example embodiments as shown in FIGS. 18 and 19 may be operated as follows after loading and/or unloading of the trailer is complete. The dock leveler may be repositioned into its stored configuration, either automatically or manually by an operator. A light may illuminate or another indicator may be provided indicating that the dock leveler is in the stored configuration. The loading dock door may be automatically closed upon successful storage of the dock leveler, or the door may be manually closed by an operator. A light may illuminate or another indicator may be provided indicating that the loading dock door is fully shut. The stabilizer system may be disengaged and pivoted to the stowed position, either automatically or manually by an operator. A light may illuminate or another indicator may be provided indicating that the stabilizer system is in the stowed position. The trailer restraint may be disengaged automatically or manually by an operator. A light may illuminate or another indicator may be provided indicating that the trailer restraint has successfully disengaged and/or that the trailer is ready to be moved away from the loading dock.

Any of the example operations described above may be performed or initiated manually or automatically. For example, a controller may be configured to require operator action (e.g., pushing a button) to initiate at least some of the exemplary operations. For example, a controller may include buttons respectively associated with at least some of the operations described above. The operator may push each button in sequence (e.g., after the previous operation is complete) to initiate the next operation. The button associated with a subsequent operation may be enabled or activated by satisfaction of an interlock confirming that a previous operation has completed satisfactorily. In other embodiments, an operator may push a single button to initiate several operations (e.g., the entire sequence described above), which are then automatically initiated at an appropriate point in the sequence (e.g., when prerequisite operations have been completed and/or prerequisite conditions have been satisfied). Accordingly, various example embodiments may utilize varying degrees of automation. Example controllers may be configured to directly control attached systems (e.g., loading dock door, trailer restraint, dock leveler, etc.) and/or may be configured to interface with individual controllers associated with the attached systems. For example, a controller may provide signals to controllers associated with attached systems or may receive signals (e.g., interlock signals) from controllers associated with attached systems.

In some example embodiments, various operator actions may be taken by an operator inside the building (e.g., warehouse worker). In some example embodiments, various operator actions may be taken by an operator outside of the building (e.g., yard truck driver). Accordingly, various controls and/or indications may be provided inside the building and/or outside the building as desired. Various operator interfaces and/or indicators may be connected to controllers and other components by wires and/or wirelessly.

Utilizing various aspects of the example devices and operations described herein, example systems and methods may include provision of trailer stabilization and/or trailer restraint. In some example embodiments, trailer stabilization may be provided generally near the forward portion of the trailer and/or trailer restraint may be provided generally near the rear portion of the trailer. Accordingly, some example embodiments may separately provide trailer stabilization and trailer restraint at different points on the trailer.

It is within the scope of the disclosure to utilize various example embodiments described herein in connection with various types of trailers, such as dry vans, refrigerated trailers, gooseneck trailers, flatbed trailers, tankers, etc. Further, it is within the scope of the present disclosure to utilize various example embodiments described herein at locations other than loading docks. For example, some example embodiments may be utilized in at trailer parking facilities, repair facilities, etc.

Following from the above description and invention summaries, it should be apparent to those of ordinary skill in the art that, while the methods and apparatuses herein described constitute example embodiments according to the present disclosure, it is to be understood that the scope of the disclosure contained herein is not limited to the above precise embodiments and that changes may be made without departing from the scope as defined by the following claims. The various features discussed herein may be used alone or in any combination within and between the various embodiments. Likewise, it is to be understood that it is not necessary to meet any or all of the identified advantages or objects disclosed herein in order to fall within the scope of the claims, since inherent and/or unforeseen advantages may exist even though they may not have been explicitly discussed herein.

What is claimed is:

1. A support for stabilizing a parked trailer, the support comprising:
    a post configured to extend upward from a surface laterally adjacent to a parking location for a trailer; and
    a frame repositionably coupled to the post, the frame comprising
        a first coupling vertically repositionable with respect to the post, and
        a first jack coupled to the frame;
    wherein the frame is repositionable between a stowed position laterally adjacent to the parking location and a deployed position in which the frame is configured to be at least partially beneath the trailer parked in the parking location;
    wherein the frame is rotatable between the stowed position and the deployed position; and
    wherein, when in the deployed position, the first jack is configured to wedge at least one of the first jack and the frame between an underside of the trailer and the surface when the trailer is parked in the parking location.

2. The support of claim 1,
    further comprising a second jack coupled to the frame; and
    wherein, when in the deployed position, the second jack is configured to wedge at least one of the second jack and the frame between the underside of the trailer and the surface when the trailer is parked in the parking location; and
    wherein the first jack and the second jack are spaced apart along the frame with respect to the post.

3. The support of claim 1, wherein the frame comprises an upper rail extending generally horizontally from the first coupling;
    a lower rail extending generally horizontally beneath the upper rail; and
    a vertical frame member extending generally vertically between the upper rail and the lower rail.

4. The support of claim 1,
    further comprising an upwardly facing fifth wheel plate disposed on the frame;
    wherein the underside of the trailer comprises a downwardly facing king pin plate; and
    wherein the fifth wheel plate of the frame is arranged to releasably engage the king pin plate of the trailer.

5. The support of claim 4, wherein the frame comprises at least one telescoping section arranged to provide at least one of vertical extension and horizontal extension of the frame.

6. The support of claim 1, wherein the first post is configured to be rigidly mounted with respect to the surface.

7. The support of claim 1, wherein the first post is configured to be movably disposed with respect to the surface.

8. The support of claim 7, wherein the first post is secured to a carriage, the carriage being generally longitudinally movable with respect to the parking location.

9. The support of claim 1, wherein the frame is rotatable about 90 degrees.

10. The support of claim 1, wherein the frame is rotatable about 180 degrees.

11. The support of claim 1, wherein the frame is rotatable about 360 degrees.

12. The support of claim 1, wherein the frame comprises a repositionable connector arranged to selectively engage an anchor secured to the surface.

13. The support of claim 1, wherein the first jack is disposed on the frame and is arranged to press downward on the surface and upward on the frame when the first jack is extended.

14. A stabilizer system for stabilizing a parked trailer, the stabilizer system comprising:
- a first post configured to extend upward from a surface laterally adjacent to a parking location for a trailer;
- a first frame repositionably coupled to the first post, the first frame comprising
  - a first coupling vertically repositionably with respect to the first post, and
  - a first jack coupled to the first frame;
- a second post configured to extend upward from the surface laterally adjacent to the parking location, the second post being positioned generally laterally opposite of the first post with respect to the parking location; and
- a second frame repositionably coupled to the second post, the second frame comprising
  - a second coupling vertically repositionable with respect to the second post, and
  - a second jack coupled to the second frame;
- wherein the first frame is repositionable between a stowed position laterally adjacent to the parking location and a deployed position in which the first frame is at least partially beneath the trailer parked in the parking location;
- wherein the second frame is repositionable between the stowed position laterally adjacent to the parking location and the deployed position in which the second frame is at least partially beneath the trailer parked in the parking location;
- wherein the first frame and the second frame are rotatable between the stowed position and the deployed position;
- wherein, when in the deployed position, the first jack is configured to wedge at least one of the first jack and the first frame between an underside of the trailer and the surface when the trailer is parked in the parking location; and
- wherein, when in the deployed position, the second jack is configured to wedge at least one of the second jack and the second frame between the underside of the trailer and the surface when the trailer is parked in the parking location.

15. The stabilizer system of claim 14, further comprising a first support member disposed on the first frame and a second support member disposed on the second frame; wherein when the first jack is retracted, the first support member contacts the surface to support the first frame above the surface; and wherein when the second jack is retraced, the second support member contacts the surface to support the second frame above the surface.

16. The stabilizer system of claim 15, wherein the first support member and the second support member each include at least one of a wheel and a caster.

17. The stabilizer system of claim 16,
- wherein the first frame rotates clockwise from the stowed position to the deployed position; and
- wherein the second frame rotates counter-clockwise from the stowed position to the deployed position.

18. The stabilizer system of claim 16,
- wherein the first frame is rotatable at least one of hydraulically, pneumatically, and electrically; and
- wherein the second frame is rotatable at least one of hydraulically, pneumatically, and electrically.

19. The stabilizer system of claim 16,
- wherein the first jack is extendable and retractable at least one of hydraulically, pneumatically, and electrically; and
- wherein the second jack is extendable and retractable at least one of hydraulically, pneumatically, and electrically.

20. The stabilizer system of claim 16, wherein the first frame comprises
- an upper rail extending generally horizontally from the first coupling,
- a lower rail extending generally horizontally beneath the upper rail, and
- a vertical frame member extending generally vertically between the upper rail and the lower rail.

21. The stabilizer system of claim 20, wherein the first jack is operatively coupled to the upper rail to press upward on the upper rail when the first jack is extended.

22. The stabilizer system of claim 14, wherein the first post and the second post are generally vertical.

23. The stabilizer system of claim 14,
- wherein the first frame extends generally horizontally from the first post; and
- wherein the second frame extends generally horizontally from the second post.

24. The support stabilizer system of claim 14,
- wherein the first jack is disposed on the first frame and is arranged to press downward on the surface and upward on the first frame when the first jack is extended; and
- wherein the second jack is disposed on the second frame and is arranged to press downward on the surface and upward on the second frame when the second jack is extended.

25. The stabilizer system of claim 14,
- wherein, when in the deployed position, the first jack is configured to lift the first frame into an engaged position in which the first frame is in contact with an underside of the trailer parked in the parking location; and
- wherein, when in the deployed position, the second jack is configured to lift the second frame into the engaged position in which the second frame is in contact with the underside of the trailer parked in the parking location.

* * * * *